(12) United States Patent
Gotoh et al.

(10) Patent No.: US 9,637,280 B2
(45) Date of Patent: May 2, 2017

(54) CAP

(71) Applicant: GENETEC CORPORATION, Tokyo (JP)

(72) Inventors: Yoshihito Gotoh, Tokyo (JP); Kenji Ueno, Tokyo (JP)

(73) Assignee: GENETEC CORPORATION, Tokyo (JP)

( * ) Notice: Subject to any disclaimer, the term of this patent is extended or adjusted under 35 U.S.C. 154(b) by 0 days.

(21) Appl. No.: 14/993,173

(22) Filed: Jan. 12, 2016

(65) Prior Publication Data

US 2016/0122093 A1    May 5, 2016

Related U.S. Application Data

(63) Continuation of application No. PCT/JP2014/003126, filed on Jun. 12, 2014.

(30) Foreign Application Priority Data

Aug. 5, 2013 (JP) .................. 2013-162016

(51) Int. Cl.
*B65D 41/34* (2006.01)
*B29C 45/00* (2006.01)
(Continued)

(52) U.S. Cl.
CPC ...... *B65D 41/3428* (2013.01); *B29C 45/0081* (2013.01); *B29C 45/14467* (2013.01);
(Continued)

(58) Field of Classification Search
CPC ............ B65D 41/3428; B65D 41/3438; B65D 41/3442; B29C 45/14467; B29C 45/0081
(Continued)

(56) References Cited

U.S. PATENT DOCUMENTS 6,695,170 B2 *  2/2004 Moretti .................. B65D 55/06
                                                                   215/250

FOREIGN PATENT DOCUMENTS

CN        2315068 Y     4/1999
CN        1244486 A     2/2000
(Continued)

OTHER PUBLICATIONS

Office Action issued in Chinese Patent Application No. 201480044107.4, mailed on Sep. 28, 2016 and translation of the main body thereof (12 pages).
(Continued)

*Primary Examiner* — Anthony Stashick
*Assistant Examiner* — Raven Collins
(74) *Attorney, Agent, or Firm* — Nakanishi IP Associates, LLC

(57) ABSTRACT

A cap to be attached to an extraction port of a container includes a cap main body detached from the container at time of opening, a ring remained on a side on which the container exists at the time of opening, and a passage portion formed separately from the cap main body and provided in the cap main body and the ring. The passage portion includes a leg portion provided in the ring and the cap main body. At least an upper portion of the leg portion provided in the cap main body and a middle portion between the upper portion and a lower portion of the leg portion provided in the ring communicate with each other. When the middle portion of the leg portion is broken, a state of a detection member provided in the passage portion changes.

14 Claims, 24 Drawing Sheets

(51) Int. Cl.
*B65D 55/02* (2006.01)
*B29C 45/14* (2006.01)
*B29L 31/56* (2006.01)

(52) U.S. Cl.
CPC ...... *B29C 45/14778* (2013.01); *B65D 55/026* (2013.01); *B29C 45/14336* (2013.01); *B29L 2031/565* (2013.01)

(58) Field of Classification Search
USPC ........................................................ 215/220
See application file for complete search history.

(56) References Cited

FOREIGN PATENT DOCUMENTS

| JP | 1994-10156 U | 2/1994 |
| JP | 2005-35675 A1 | 2/2005 |
| JP | 2008-285208 A1 | 11/2008 |
| JP | 2010-163180 A1 | 7/2010 |
| JP | 2012-176786 A1 | 9/2012 |
| JP | 5229900 B2 | 7/2013 |

OTHER PUBLICATIONS

Search Report issued in Chinese Patent Application No. 201480044107.4, mailed on Sep. 28, 2016 (2 pages).
International Search Report issued in International Application No. PCT/JP20141003126, mailed on Sep. 22, 2014 and translation thereof (6 pages).

* cited by examiner

CAP

CROSS-REFERENCE TO RELATED APPLICATIONS

This application is a continuation application of International Patent Application No. PCT/JP2014/003126 filed on Jun. 12, 2014, which claims priority to Japanese Patent Application No. 2013-162016 filed on Aug. 5, 2013, the entire contents of which are incorporated by reference in its entirety.

TECHNICAL FIELD

The present invention relates to a cap to be attached to an extraction port of a container and more specifically relates to a cap enabling whether or not the cap has been opened to be determined easily.

BACKGROUND ART

Patent Literature 1 or the like proposes a cap having a tamper-resistant function. When such a cap is opened, a connection state between a cap main body and a ring via a coupling portion is released. Once the connection state via the coupling portion is released, a distance between the cap main body and the ring differs from that before the breakage even when the cap main body is attached to an extraction port again. For this reason, one can recognize whether the cap main body has been opened when one looks at it well.

CITATION LIST

Patent Literature

Patent Literature 1: JP 2008-285208 A

However, the amount of the difference is not large, and one may not recognize that the cap main body has been opened when one does not look at it with care.

SUMMARY OF INVENTION

One or more embodiments of the present invention is to provide a cap enabling one to easily recognize whether or not the cap has been opened.

According to one or more embodiments of the present invention, a cap to be attached to an extraction port of a container includes: a cap main body detached from the container at time of opening; a ring remained on a side on which the container exists at the time of opening; and a passage portion formed separately from the cap main body and the ring or formed by covering a side surface and an upper surface of the cap main body with a cover and provided in the cap main body and the ring, wherein the passage portion includes a leg portion provided in the ring and the cap main body, wherein at least an upper portion of the leg portion provided in the cap main body and a middle portion between the upper portion and a lower portion of the leg portion provided in the ring communicate with each other, and wherein, when the middle portion of the leg portion is broken, a state of a detection member provided in the passage portion changes.

By looking at the state (a color or a shape) of the detection member, one can easily recognize whether or not the cap has been opened.

Also, since the passage portion to be broken is formed separately from the cap main body and the ring or is formed between the cap main body and the cover, the cap can be manufactured more easily than in a mode in which an air passage is formed by producing a hole in the cap main body and the like.

In one or more embodiments of the present invention, the passage portion is formed separately from the cap main body and the ring, the detection member is made of a string-like member, and the leg portion is formed by a paper-like member made in a state of coating the string-like detection member.

The detection member and the leg portion can be formed easily by pouring a paper material to coat the string-like member and forming a paper layer around the string-like member to use the paper layer as the leg portion.

The string-like member is not limited to a member having elasticity such as fluorine-containing rubber and silicon and may be a member formed by bundling fibers and having almost no elasticity. In this case, when the middle portion is broken, the string-like member is partially exposed from the middle portion. One finds the cap has been opened from existence of the exposed string-like member.

In one or more embodiments of the present invention, the detection member is made of a string-like elastic member, is fixed at an end portion thereof to the passage portion in a stretched state, and is contracted by breakage of the middle portion.

In addition, in one or more embodiments of the present invention, the passage portion is formed by the cover and the cap main body, and the detection member is an elastic member, is fixed at an end portion thereof to the passage portion in a stretched state, and is contracted by breakage of the middle portion.

The above mode is more advantageous than a mode in which whether or not the cap has been opened is determined based on whether or not the detection member is chemically reacted in that malfunction (discoloring even in an unopened state) caused by deterioration is unlikely to occur.

In addition, in one or more embodiments of the present invention, the passage portion is formed by the cover and the cap main body, and the cover has as much transparency as to enable the detection member inside to be seen.

One can visually recognize the state change of the detection member without providing the cover with a member such as a window.

In addition, in one or more embodiments of the present invention, the passage portion is formed separately from the cap main body and the ring, the detection member is an elastic member, is fixed at an end portion thereof to the passage portion in a stretched state, and is contracted by breakage of the middle portion, and the leg portion is a coating member coating the elastic member.

The leg portion of the passage portion can be formed only by coating the detection member.

In addition, in one or more embodiments of the present invention, the passage portion is formed separately from the cap main body and the ring, the passage portion includes the leg portion, a display chamber formed in a cylindrical shape having a bottom portion and a side portion, opened at an upper portion thereof, and attached to the upper surface of the cap main body, the detection member mounted or fixed in the display chamber at least partially, and a lid portion used to close the opening of the upper portion of the display chamber, made of a transparent member at a part thereof opposed to the bottom portion of the display chamber, and engaging with the display chamber to be permanently set at time of being attached, the leg portion and the display chamber are made of a material having a higher melting point than that of a material for the cap main body, the cap main body and the ring are formed by, in a state in which the leg portion and the display chamber are attached to a mold, pouring a molten material constituting the cap main body and the ring, and the lid portion is attached to the display chamber after the cap main body and the ring have been formed.

When the molten material is solidified, the passage portion can be brought into close contact with the cap main body and the like. Thus, air rarely leaks from part of the passage portion, and the passage portion is hard to come off of the cap main body and the like when the cap main body is detached from the ring.

Also, parts of the passage portion excluding the middle portion of the leg portion and the upper surface of the display chamber can be formed in the form of being buried in the cap main body and the like. In this case, the passage portion is harder to come off of the cap main body and the like when the cap main body is detached.

Since the cap is formed by, in the state in which the passage portion (excluding the detection agent and the lid portion) formed in advance is attached to the mold, pouring the molten material constituting the cap main body and the ring, a mold having an approximately equal shape to that of a cap provided with no passage portion can be used.

In addition, in one or more embodiments of the present invention, the passage portion is formed separately from the cap main body and the ring, and the cap main body and the ring are formed in a state of not attaching the passage portion, and, after they are formed, the passage portion is attached by means of fitting.

In this case, since the passage portion is not subject to a high temperature at the time of injection molding of the cap main body and the like, the passage portion can be made of a material having a low melting point.

In addition, in one or more embodiments of the present invention, the detection member is a member which changes color in accordance with concentration of a specific substance contained in air that the member itself contacts.

In addition, in one or more embodiments of the present invention, the passage portion includes the leg portion, a display chamber formed in a cylindrical shape having a bottom portion and a side portion, opened at an upper portion thereof, and attached to the upper surface of the cap main body, the detection member mounted or fixed in the display chamber at least partially, and a lid portion used to close the opening of the upper portion of the display chamber, made of a transparent member at a part thereof opposed to the bottom portion of the display chamber, and engaging with the display chamber to be permanently set at time of being attached, and the part of the lid portion opposed to the display chamber is provided with a member reflecting light from outside.

Light from outside is difficult to enter the display chamber, and deterioration of the detection member caused by light rarely occurs.

In addition, in one or more embodiments of the present invention, the detection member is a sheet-like member in which a solvent which changes color in accordance with concentration of a specific substance contained in air that the member itself contacts is absorbed.

This can prevent part of the solvent from passing through the leg portion or the like and leaking outside.

In addition, in one or more embodiments of the present invention, the middle portion of the leg portion is formed to be thinner than the upper portion and the lower portion of the leg portion.

This enables the middle portion to be broken easily when the cap main body (or the cover) is turned.

As described above, according to one or more embodiments of the present invention, it is possible to provide a cap enabling one to easily recognize whether or not the cap has been opened.

DESCRIPTION OF EMBODIMENTS

Figure 1:
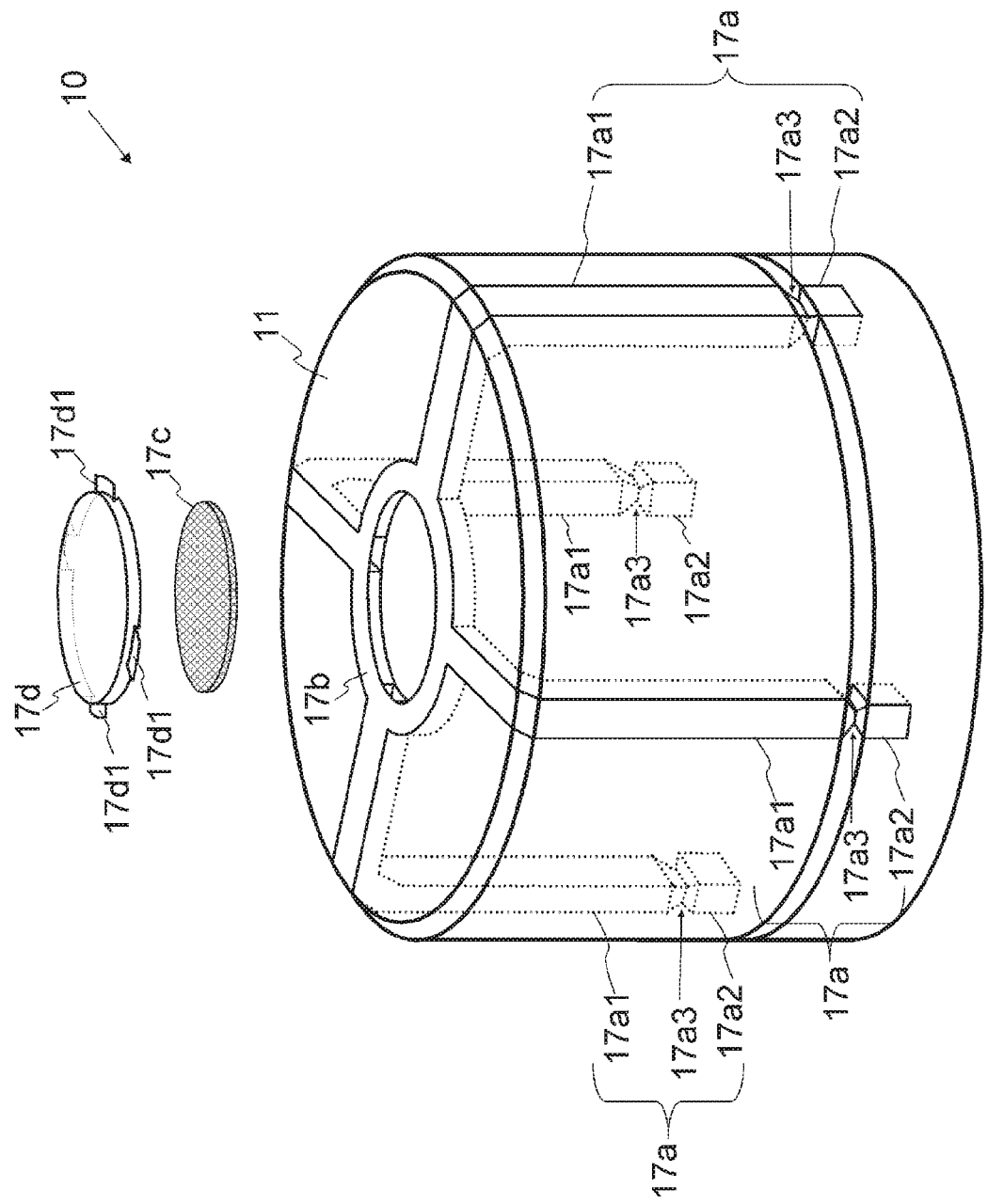
FIG. 1 is a perspective view of a cap according to a first embodiment before an oxygen detection agent and a lid portion are attached.
Figure 2:
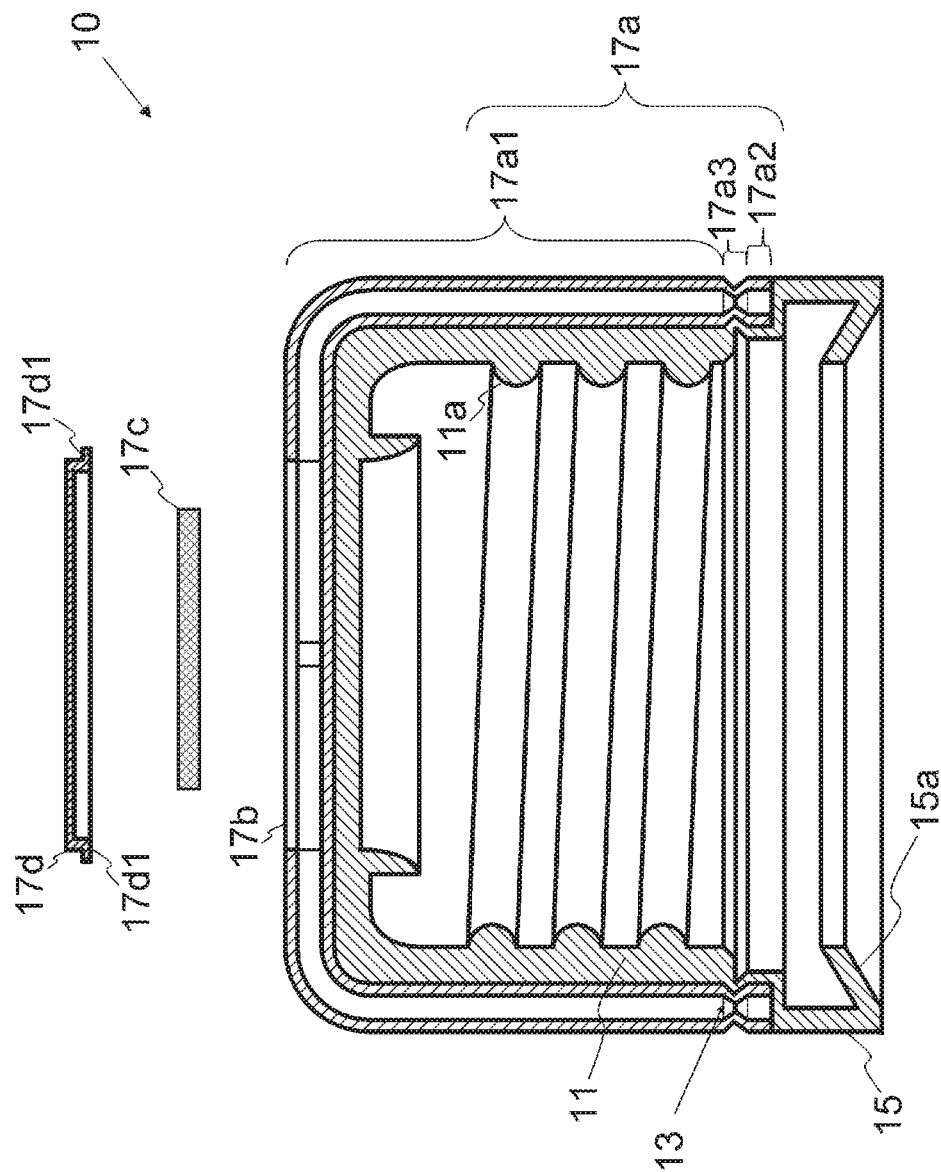
FIG. 2 is a cross-sectional view of the cap according to the first embodiment before the oxygen detection agent and the lid portion are attached.

Hereinbelow, a first embodiment will be described with reference to the drawings. A cap 10 according to the first embodiment includes a cap main body 11, a plurality of coupling portions 13 provided at a lower portion of the cap main body 11 and cuttable from the cap main body 11, a ring 15 connected to the cap main body 11 via the coupling portions 13, and a passage portion 17 attached to the cap main body 11 and the ring 15. The cap 10 is attached to an extraction port 50 of a container containing a beverage such as a PET bottle. In the first embodiment, the cap main body 11 and the ring 15 form a first member, and the passage portion 17 forms a second member.

An inner surface of the cap main body 11 is provided with an inner screw portion 11a corresponding to an outer screw portion 51 provided on an outer circumferential surface of the extraction port 50.

The coupling portions 13 connect a lower end portion of a side portion of the cap main body 11 with an upper end portion of a side portion of the ring 15 at plural positions and are broken when the cap main body 11 is detached from the ring 15. Although a mode in which the cap main body 11 and the ring 15 are connected via the coupling portions 13 is described in the first embodiment, the coupling portions 13 may be omitted, and a mode in which the cap main body 11 and the ring 15 are connected only via leg portions 17a may be employed.

The ring 15 includes a plurality of retaining flaps 15a on an inner circumferential side of the ring as a retaining means. Each retaining flap 15a is stretched from a lower edge of the ring 15 toward a center of the ring 15.

Figure 3:
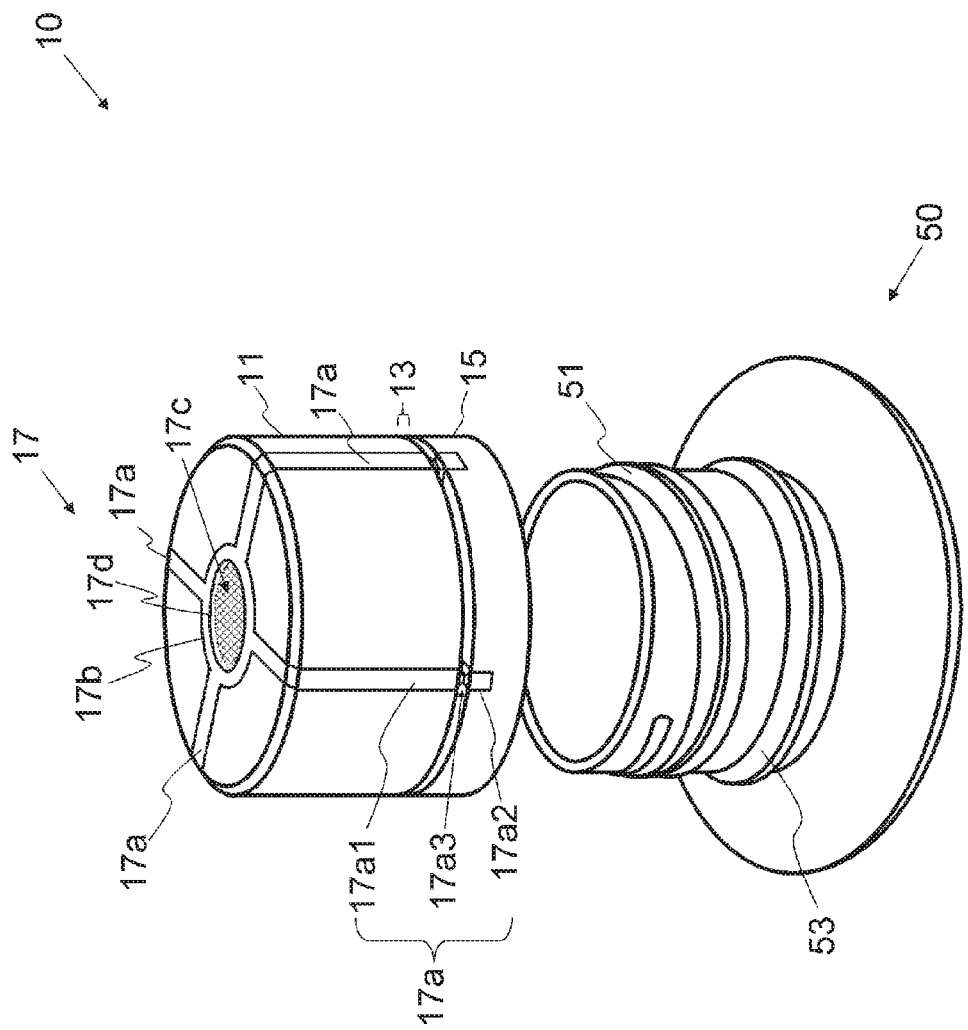
FIG. 3 is a perspective view illustrating positional relationship between the cap and an extraction port in a first state.
Figure 4:
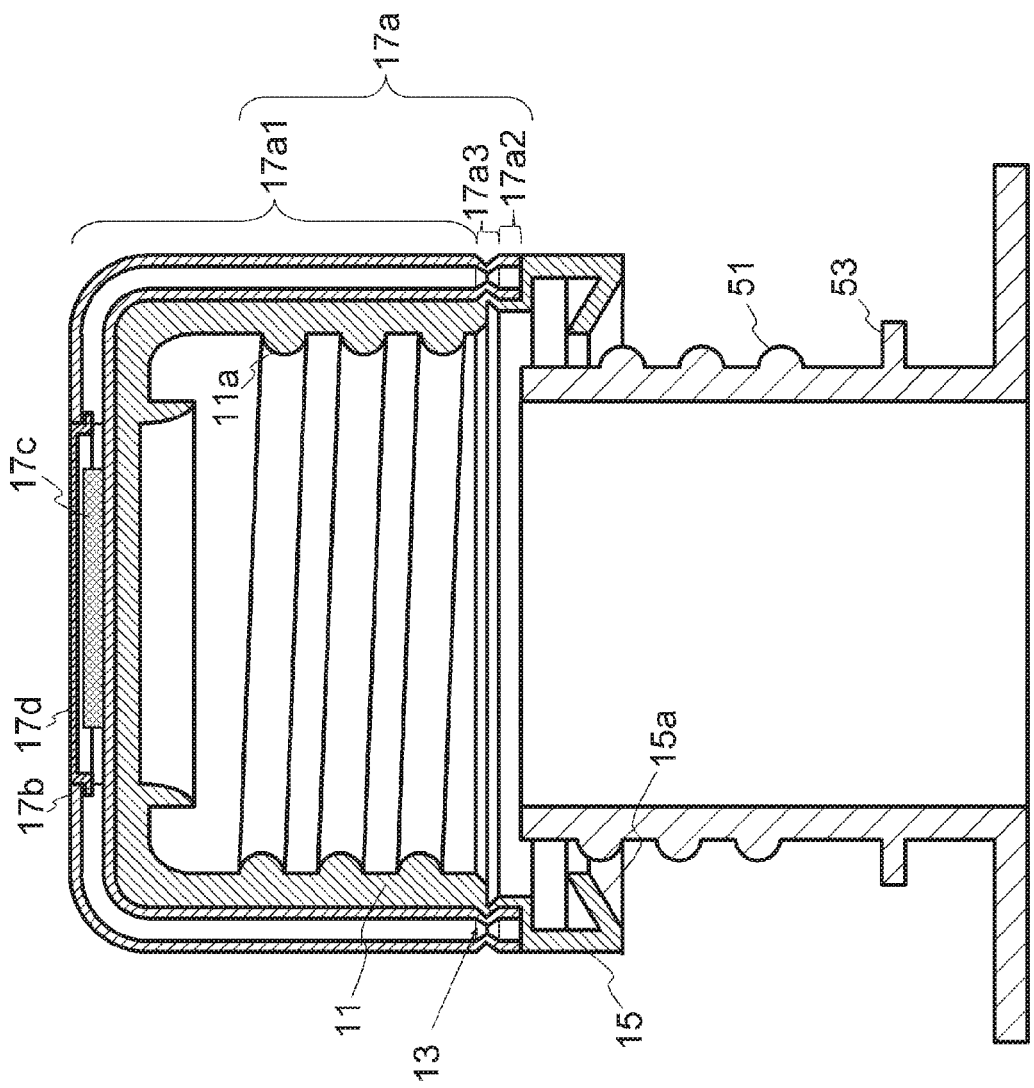
FIG. 4 is a cross-sectional view illustrating the positional relationship between the cap and the extraction port in the first state.
Figure 5:
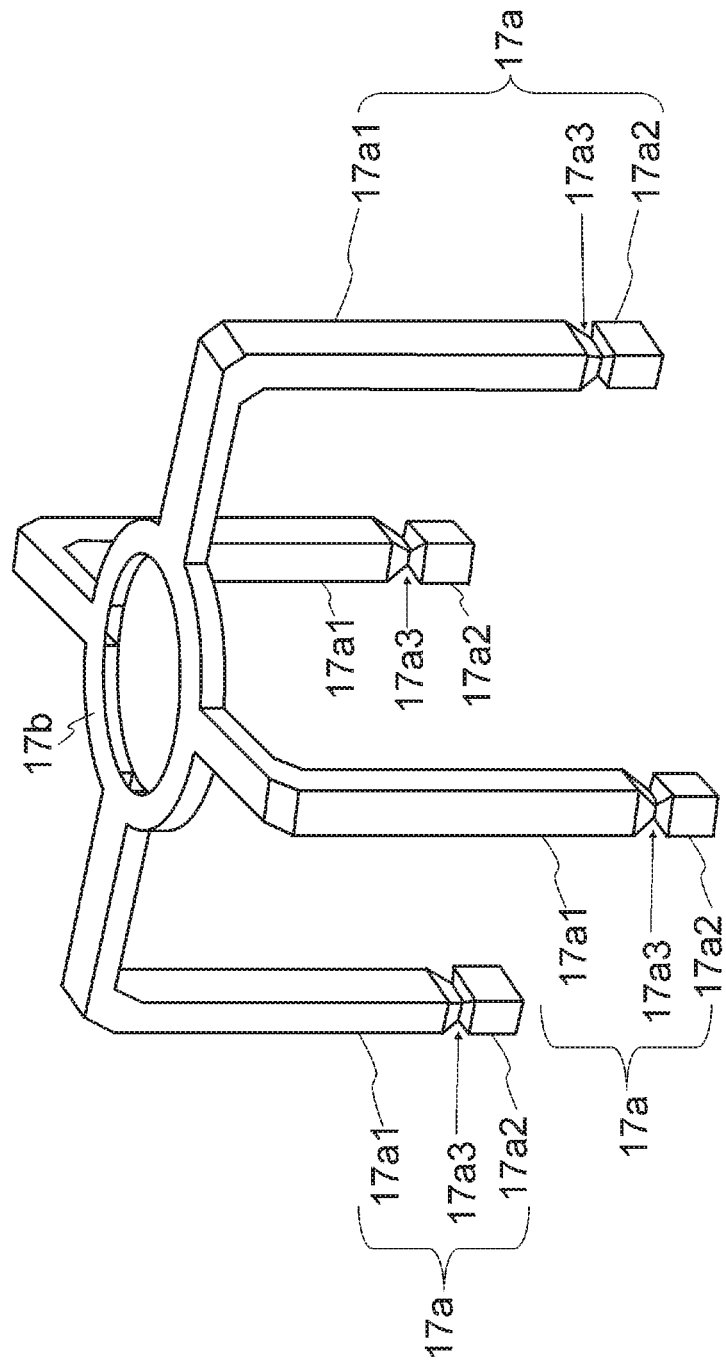
FIG. 5 is a perspective view of a second member (a passage portion).
Figure 6:
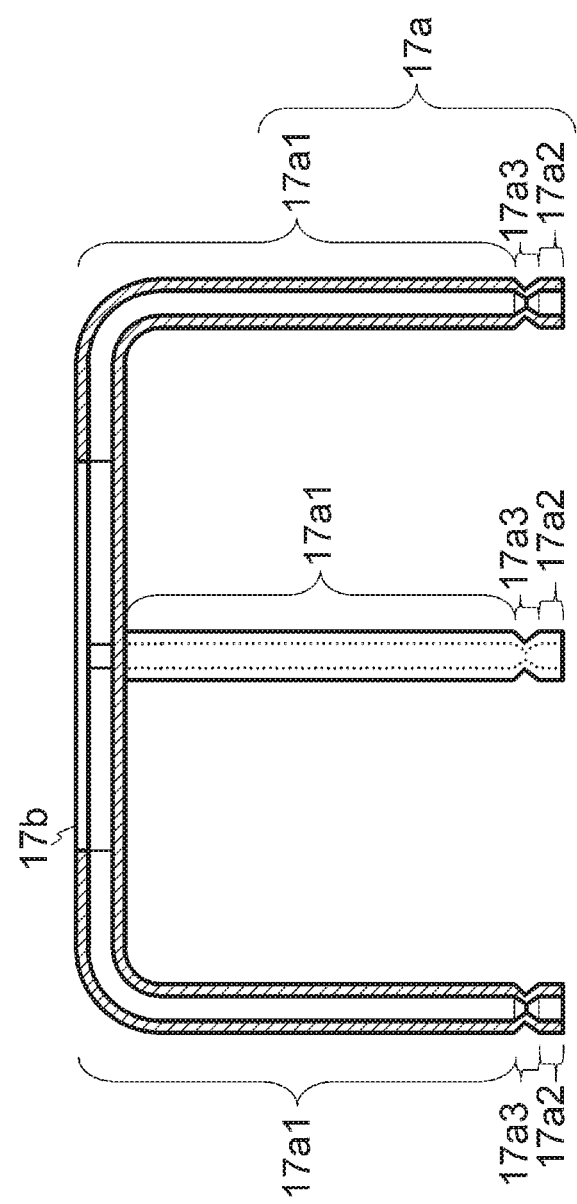
FIG. 6 is a cross-sectional view of the second member (the passage portion).

The cap main body 11 and the ring 15 are connected via the coupling portions 13 before being attached to the extraction port 50 (a first state, refer to FIGS. 3 and 4).

The passage portion 17 is a passage communicating the lower portion of the cap main body 11 with an upper portion of the cap main body 11 and is sealed while the cap main body 11 and the ring 15 are connected via the coupling portions 13 (the first state and a second state). The passage portion 17 includes the leg portions 17a, a display chamber 17b, an oxygen detection agent 17c, and a lid portion 17d.

Each leg portion 17a is a tubular member formed approximately in an L shape and having a passage inside, and a part extending in a horizontal direction is attached to an upper surface of the cap main body 11 while a part extending in a vertical direction is attached to side surfaces of the cap main body 11 and the ring 15. Two or more leg portions 17a are provided so that air may flow in the air passage easily when a sealing state is released. In the first embodiment, a mode in which four leg portions 17a are provided is described. Also, although a mode in which a cross-section of each leg portion 17a is approximately rectangular is described in the first embodiment, the cross-section may be in another shape such as a circular shape as long as the leg portion 17a is tubular.

A part of the leg portion 17a to be attached to the cap main body 11 (an upper portion 17a1) is preferably formed to be thinner than the upper portion and the side portion of the cap main body 11 so as not to project outward or inward from the cap main body 11 at the time of being attached to the cap main body 11.

A part (a middle portion 17a3) between the part of the leg portion 17a to be attached to the cap main body 11 (the upper portion 17a1) and a part of the leg portion 17a to be attached to the ring 15 (a lower portion 17a2) is preferably formed to be thinner than other parts by squeezing or the like so that the part can be broken easily when the cap is detached. At least the upper portion 17a1 and the middle portion 17a3 of the leg portion 17a are communicated, and in the first embodiment, a mode in which the upper portion 17a1, the middle portion 17a3, and the lower portion 17a2 are communicated is described.

In one mode, as in the first embodiment, the middle portion 17a3 of the leg portion 17a may be attached to the coupling portion 13, and in another mode, the middle portion 17a3 may be formed separately from the coupling portion 13.

The part of the leg portion 17a to be attached to the ring 15 (the lower portion 17a2) is preferably formed to be thinner than the ring 15 so as not to project outward or inward from the ring 15 at the time of being attached to the ring 15.

The leg portion 17a may be formed by means of injection molding, in which a molten material is poured into a mold and is molded, or by bending a linear tubular member in an L shape and squeezing a part corresponding to the middle portion 17a3. In a case in which an elastic member (a string-like member 17e) is used as a detection member as described below, the leg portion 17a may be used as a coating member coating the elastic member.

The display chamber 17b is in a cylindrical shape having a bottom portion and a side portion, is opened at an upper portion thereof, and is attached to the upper surface of the cap main body 11. At the bottom portion of the display chamber 17b, the oxygen detection agent 17c is mounted or fixed. At the side portion of the display chamber 17b, parts communicating with the leg portions 17a are opened.

The oxygen detection agent 17c changes color in accordance with concentration of oxygen contained in air that the oxygen detection agent 17c itself contacts. For example, a configuration including a cyclodextrin kind, a reversible color-changing organic dye, and a reducing agent is raised. In the first and second states, oxygen concentration of air in the passage portion 17 has no change since the passage portion 17 is sealed. In a third state, since the passage portion 17 is unsealed and opened due to breakage of the middle portion 17a3, air flows into the upper portions 17a1 of the leg portions 17a and the display chamber 17b of the passage portion 17, the oxygen concentration of the air in the display chamber 17b changes, and the oxygen detection agent 17c changes color. The color of the oxygen detection agent 17c can be visually recognized through the lid portion 17d.

Figure 14:
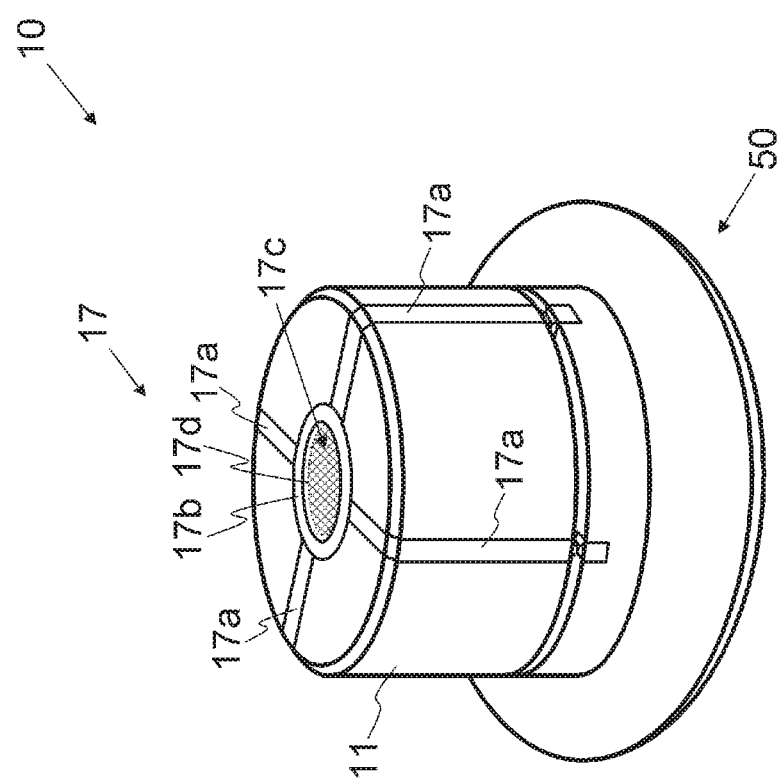
FIG. 14 is a perspective view illustrating positional relationship between the cap and the extraction port in a second state.
Figure 15:
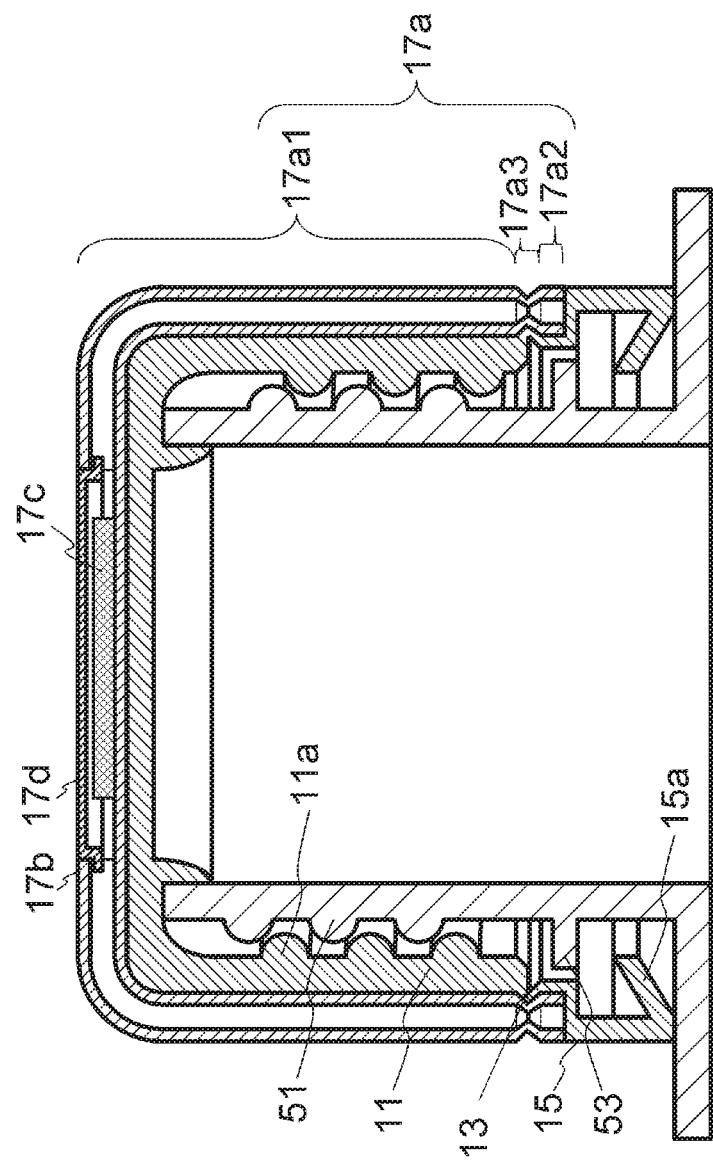
FIG. 15 is a cross-sectional view illustrating the positional relationship between the cap and the extraction port in the second state.
Figure 16:
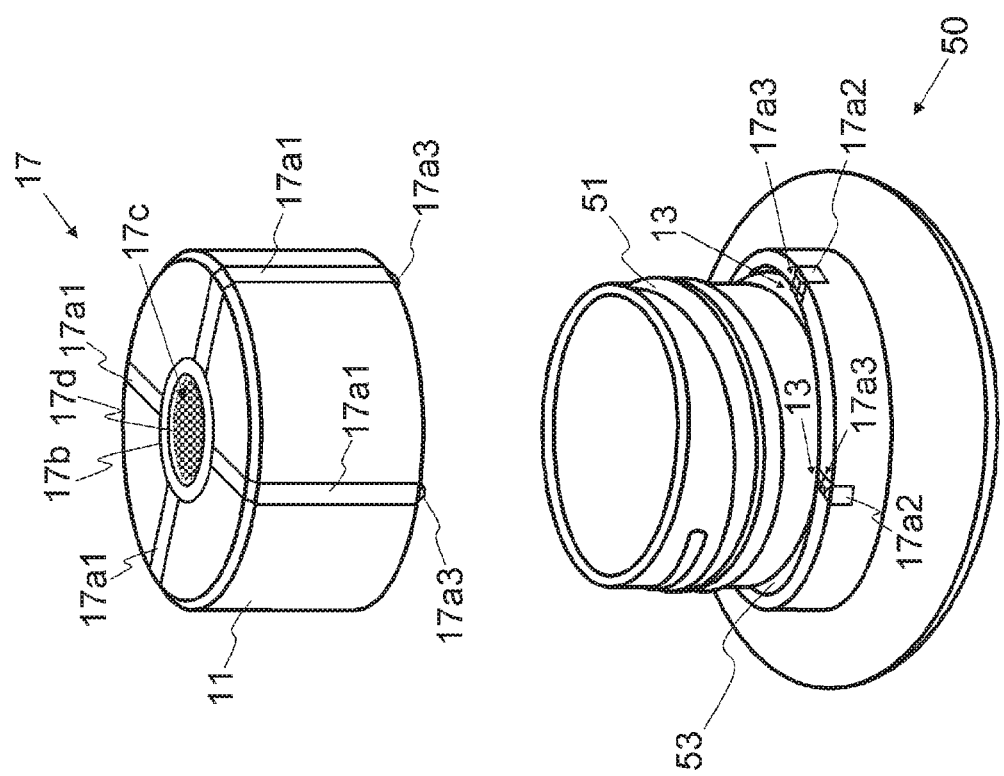
FIG. 16 is a perspective view illustrating positional relationship between the cap and the extraction port in a third state.
Figure 17:
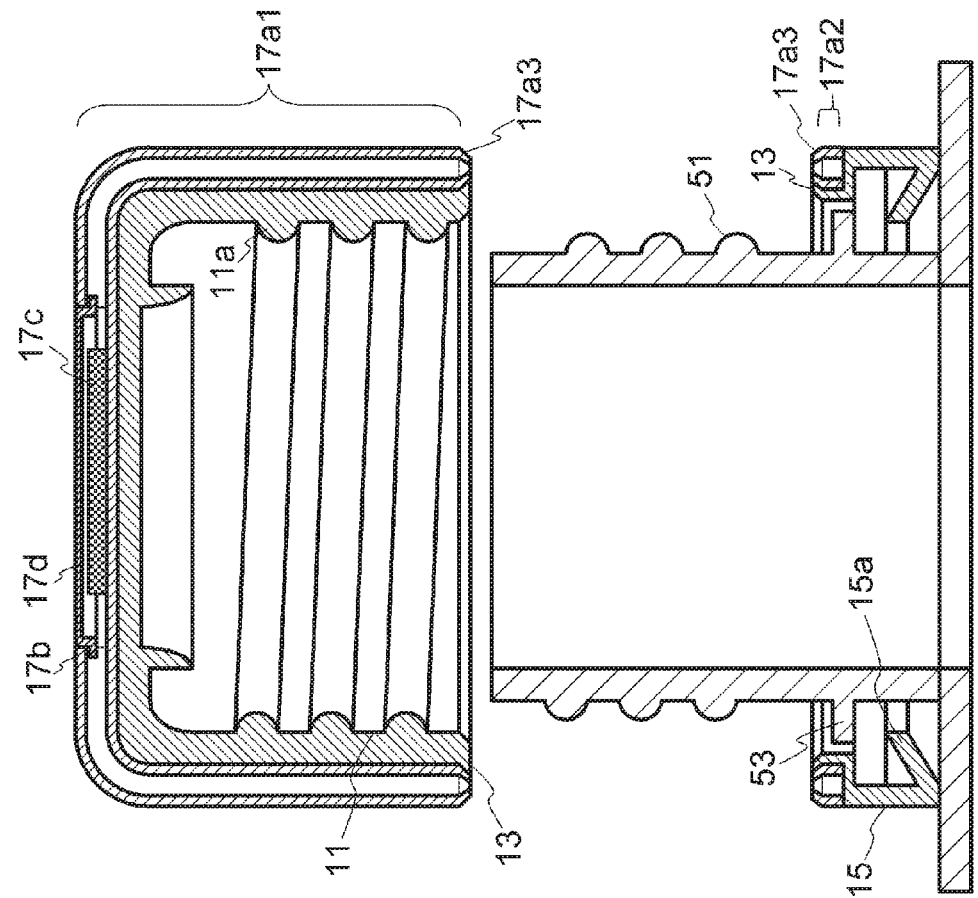
FIG. 17 is a cross-sectional view illustrating the positional relationship between the cap and the extraction port in the third state.

As an example, the oxygen detection agent 17c before the color change is shown in a rhombic plaid pattern in FIGS. 1 to 4 and 12 to 15, and the oxygen detection agent 17c after the color change is shown in a checkerboard pattern in FIGS. 16 and 17.

The oxygen detection agent 17c may be a solvent itself (a tablet) or may be in a sheet-like member prepared by letting the solvent absorbed in a solid such as paper and plastic to prevent part of the solvent such as powder from passing through the upper portions 17a1 or the like and leaking outside.

The lid portion 17d is used to close the opening of the upper portion of the display chamber 17b and has engaging members permanently set at the time of being attached and engaging with the display chamber 17b, such as projecting portions 17d1 engaging with the openings on the side surface of the display chamber 17b at the parts connected with the leg portions 17a.

A part of the lid portion 17d opposed to the bottom portion of the display chamber 17b is made of a transparent member to enable one to visually recognize the color of the oxygen detection agent 17c fixed in the display chamber 17b through the lid portion 17d.

However, in a case in which the oxygen detection agent 17c is to be deteriorated (discolored) by light, a mode in which the lid portion 17d is made of a member, such as a half mirror, making it difficult for light from outside to be transmitted into the display chamber 17b (reflecting part of the light from outside), or a mode in which the member making it difficult for light to be transmitted is attached to an upper surface or a lower surface of the lid portion 17d, may be employed. By doing so, light from outside is difficult to enter the display chamber, and deterioration of the detection member caused by light rarely occurs.

The leg portions 17a and the display chamber 17b are made of a material excellent in heat resistance (at least having a higher melting point than that of a material for the cap main body 11) so as not to be deformed even at the time of contacting the material for the cap main body 11 which has been melted when the cap main body 11, the coupling portions 13, and the ring 15 are formed with use of a mold by means of injection molding or the like. Examples of the material are heat-resistant plastic and metal.

Meanwhile, in a case in which the leg portions 17a have sufficient transparency to enable the detection member (the oxygen detection agent 17c or the below-mentioned string-like member 17e) inside to be viewed, one can confirm state changes of the detection member (a color change of the oxygen detection agent 17c or the degree of contraction of the string-like member 17e) through the leg portions 17a, and a window (the lid portion 17d) on the upper surface of the display chamber 17b can thus be omitted.

Figure 7:
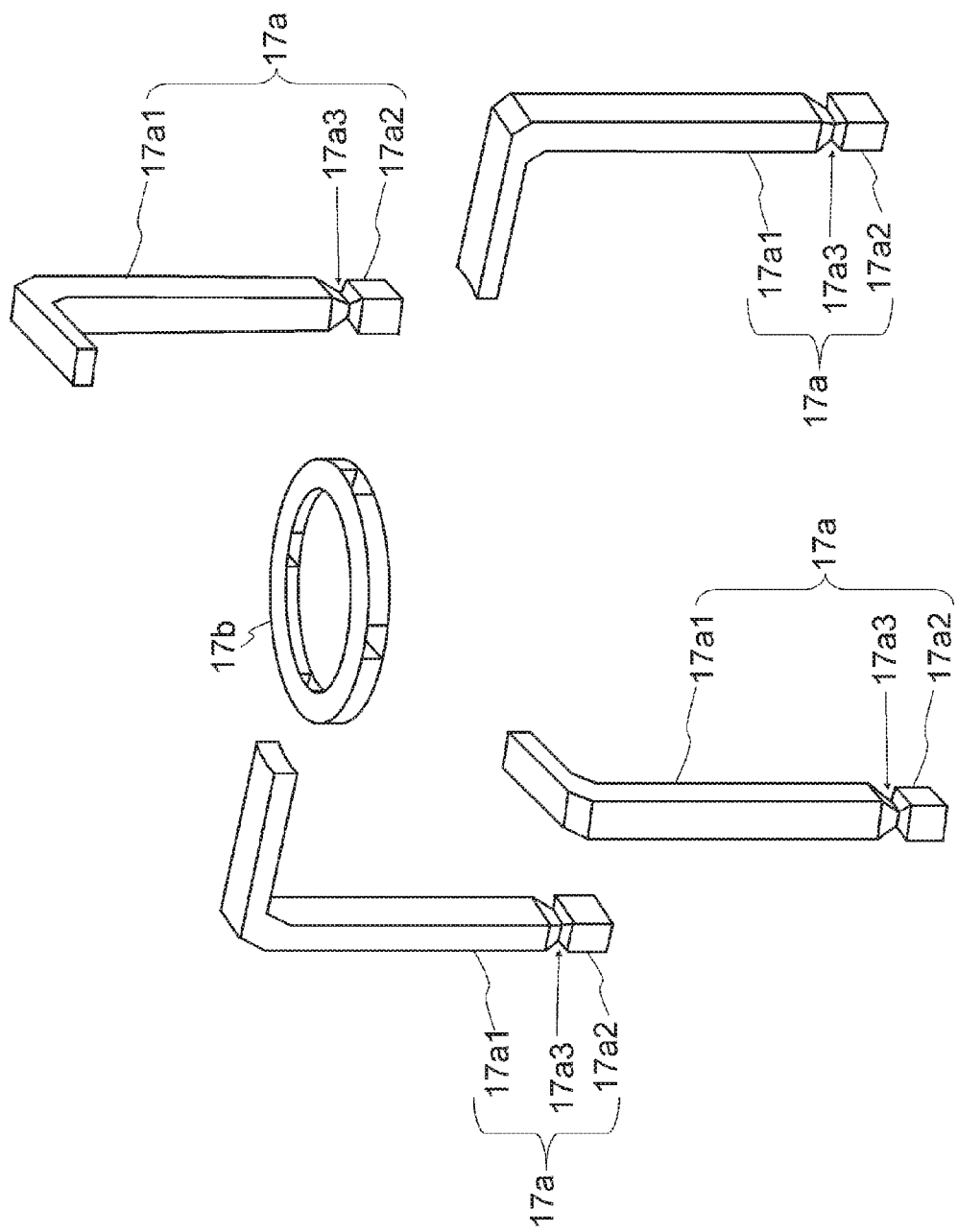
FIG. 7 is a perspective view of leg portions and a display chamber before they are connected.
Figure 8:
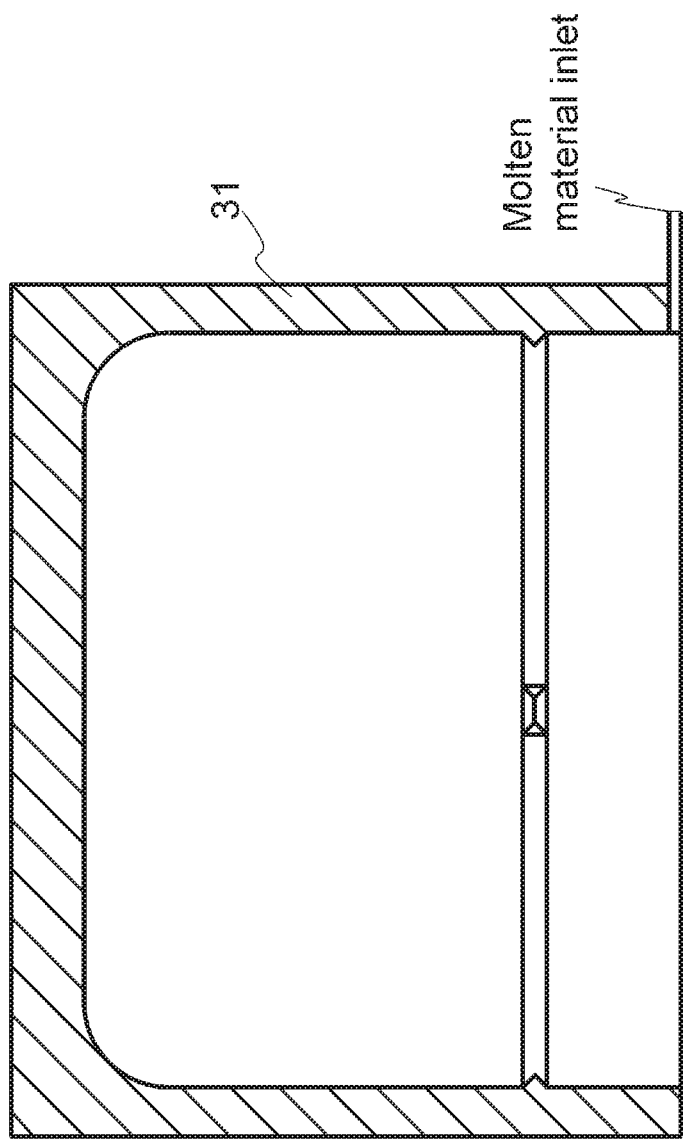
FIG. 8 is a cross-sectional view of a first mold.
Figure 9:
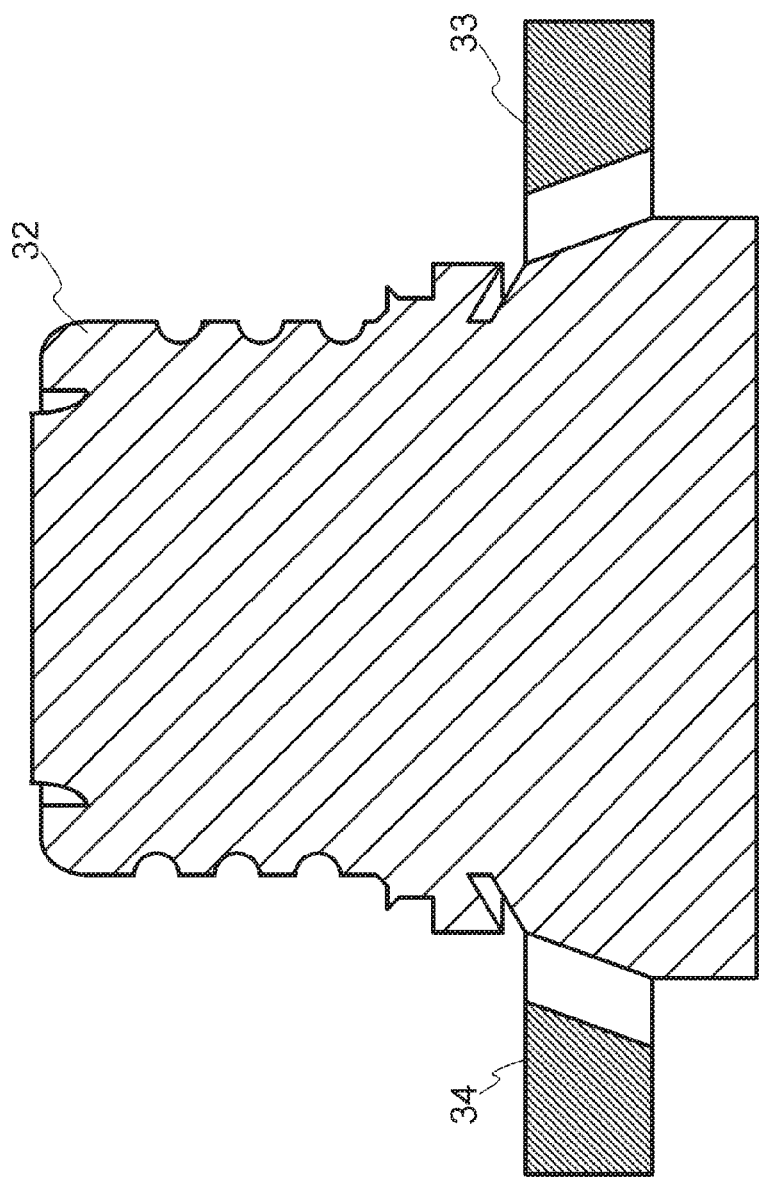
FIG. 9 is a cross-sectional view of second to fourth molds.

The leg portions 17a and the display chamber 17b may be molded integrally, or may be formed separately and combined after completion of the respective members as in FIG. 7.

Figure 10:
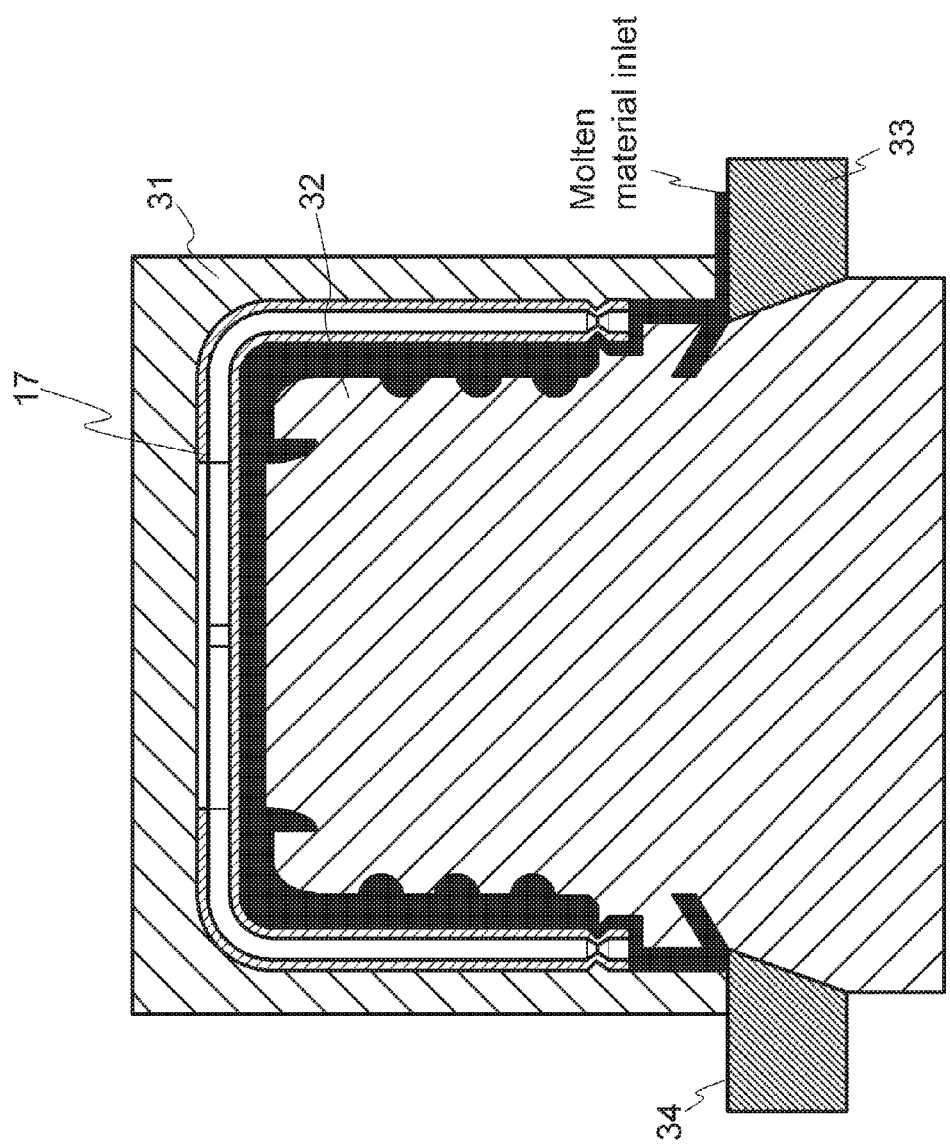
FIG. 10 is a cross-sectional view illustrating a state in which a molten material of a cap main body and the like has been poured and illustrates a part in which the leg portions are seen.
Figure 11:
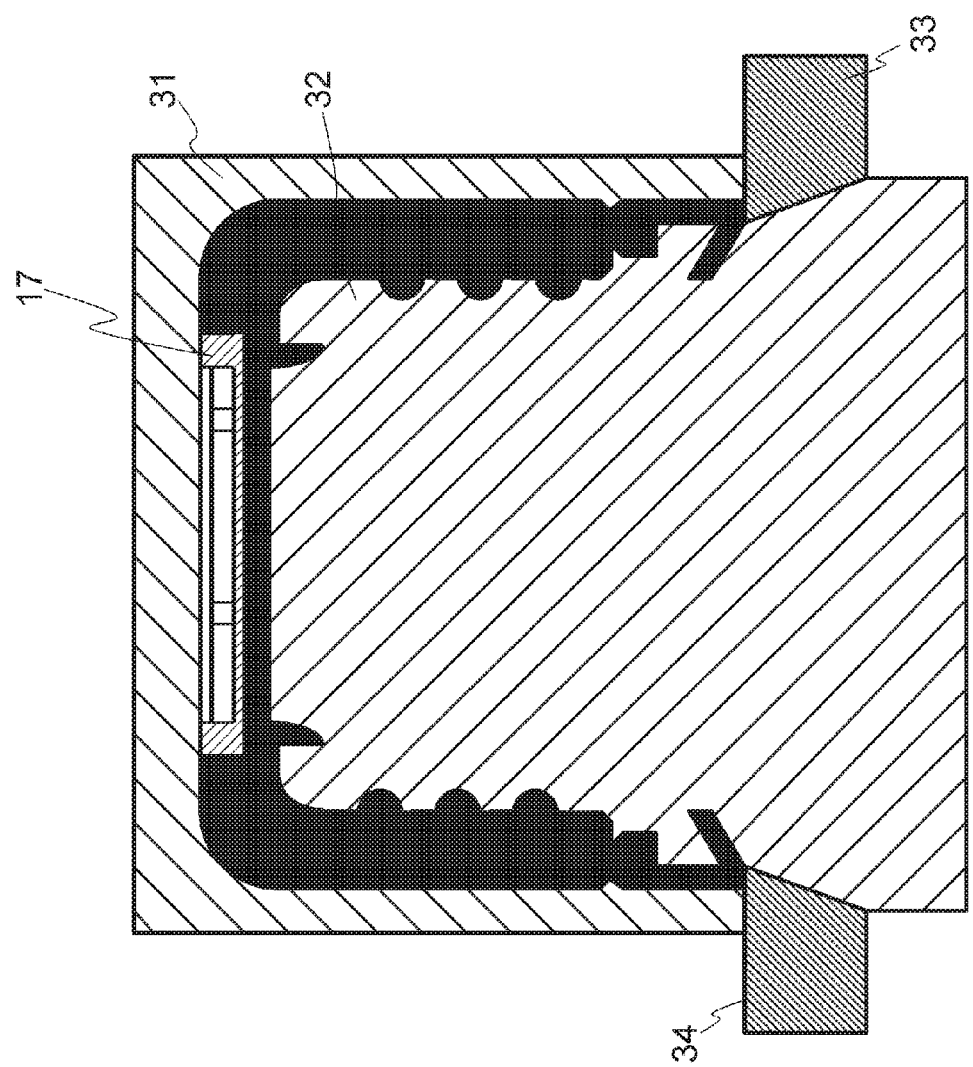
FIG. 11 is a cross-sectional view illustrating the state in which the molten material of the cap main body and the like has been poured and illustrates a part in which the leg portions are not seen.
Figure 12:
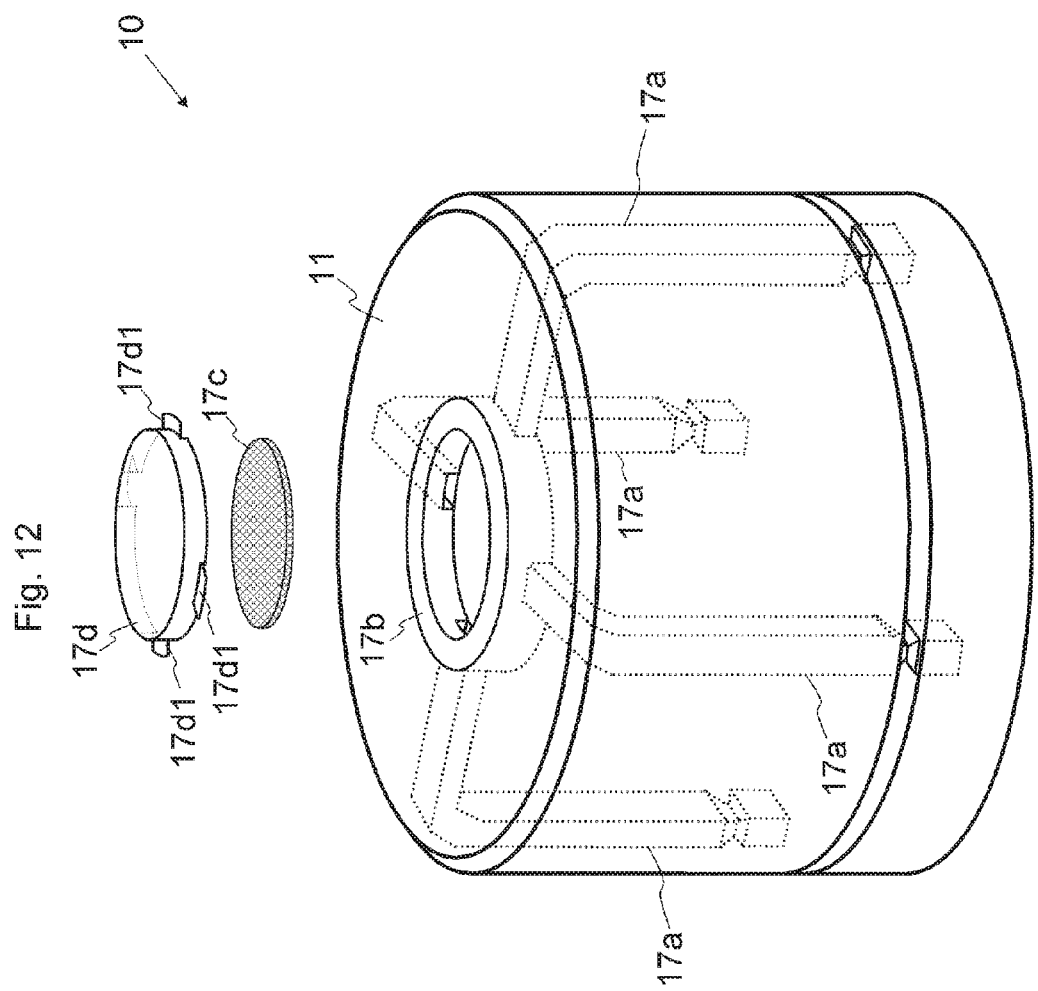
FIG. 12 is a perspective view of the cap in a case in which the leg portions are buried in the cap main body and the like before the oxygen detection agent and the lid portion are attached.
Figure 13:
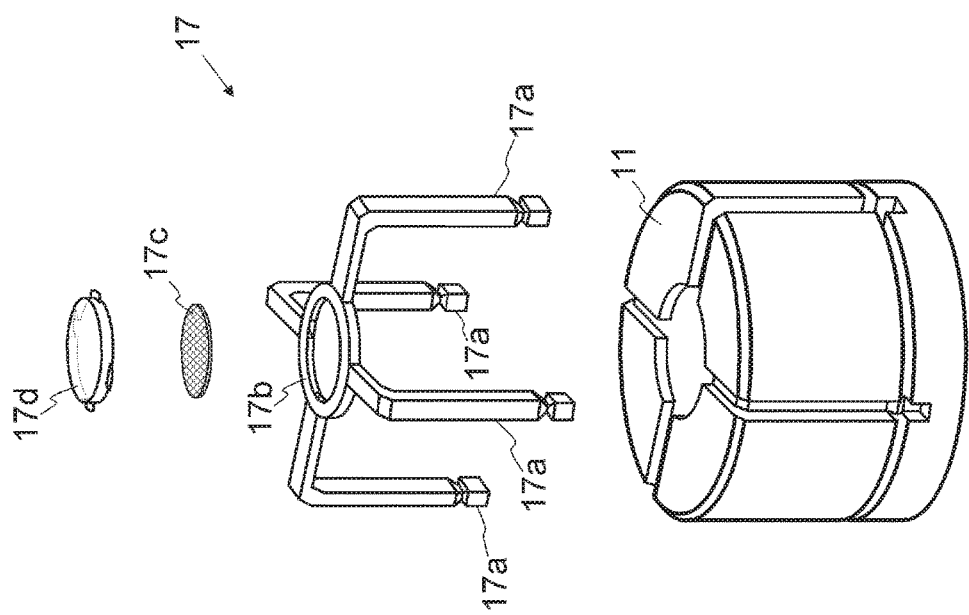
FIG. 13 is a perspective view of the cap in a mode in which the second member (the passage portion) is attached to a first member (the cap main body) that has been molded before the oxygen detection agent and the lid portion are attached.

The cap 10 is formed with use of a mold by means of injection molding or the like. Specifically, the cap 10 is formed by, in a state in which the passage portion 17 (excluding the oxygen detection agent 17c and the lid portion 17d) formed in advance is attached to any of first to fourth molds 31 to 34 in a space surrounded by the first to fourth molds 31 to 34, pouring a molten material constituting the cap main body 11, the coupling portions 13, and the ring 15 (shown in black in FIGS. 10 and 11) into the space (refer to FIGS. 8 to 11). In a case in which the lower portion 17a2 of each leg portion 17a communicates with the upper portion 17a1, it is preferable to seal an end portion of the lower portion 17a2 of the leg portion 17a to prevent the molten material from entering the end portion.

Fixing (or mounting) of the oxygen detection agent 17c and permanent setting of the lid portion 17d are performed after the leg portions 17a and the display chamber 17b are attached to the cap main body 11 and the ring 15. For this reason, the oxygen detection agent 17c will not be subject to a high temperature at the time of the injection molding. When the lid portion 17d is attached to the upper portion of the display chamber 17b, the passage portion 17 is sealed by the ring 15 at the lower portion thereof and by the lid portion 17d at the upper portion thereof.

It is preferable to perform a process of fixing (or mounting) the oxygen detection agent 17c in the display chamber 17b and a process of attaching the lid portion 17d to the display chamber 17b in a state in which oxygen concentration in the passage portion 17 is low by bringing the passage portion 17 into a vacuum state, filling the passage portion 17 with nitrogen, or the like. In this case, the degree of the difference in oxygen concentration in the passage portion 17 between the concentration before unsealing and that after unsealing is large, and the color change of the oxygen detection agent 17c is visually recognized easily.

When the molten material is solidified, the passage portion 17 can be brought into close contact with the cap main body 11 and the like. Thus, air rarely leaks from part of the passage portion 17, and the passage portion 17 is hard to come off of the cap main body 11 and the like when the cap main body 11 is detached from the ring 15.

Also, parts of the passage portion 17 excluding the middle portions 17a3 of the leg portions 17a and the upper surface of the display chamber 17b can be formed in the form of being buried in the cap main body 11 and the like. In this case, the passage portion 17 is harder to come off of the cap main body 11 and the like when the cap main body 11 is detached (refer to FIG. 12).

A mode may be employed in which the cap main body 11, the coupling portions 13, and the ring 15 are formed by means of injection molding or the like in a state of not attaching the passage portion 17 (refer to FIG. 13), and in which, after they are formed, the passage portion 17 is attached by means of fitting or the like. In this case, since the passage portion 17 is not subject to a high temperature at the time of the injection molding of the cap main body 11 and the like, the passage portion 17 can be made of a material having a low melting point.

When the inner screw portion 11a of the cap main body 11 is brought close to the outer screw portion 51 of the extraction port 50 in a state in which the cap main body 11 and the ring 15 are connected via the coupling portions 13, and the cap 10 is turned in a cap attaching direction, the inner screw portion 11a of the cap main body 11 is engaged with the outer screw portion 51 of the extraction port 50 to cause the cap 10 to be attached to the extraction port 50 (the second state, refer to FIGS. 14 and 15).

After the attachment, when the cap main body 11 is turned in a cap detaching direction, the ring 15 connected with the cap main body 11 via the coupling portions 13 is also turned together in the direction of being detached from the extraction port 50. However, the retaining flaps 15a are retained by a rib 53 projecting from the extraction port 50 in a radial direction. When turning of the cap main body 11 in the cap detaching direction is continued even after the retention, the coupling portions 13 and the middle portions 17a3 are broken, the cap main body 11 including part of the coupling portions 13 is detached from the ring 15, and the upper portions 17a1 of the leg portions 17a of the passage portion 17 including part of the middle portions 17a3 are detached from the lower portions 17a2. The ring 15 including the remaining parts of the coupling portions 13 and the lower portions 17a2 including the remaining parts of the middle portions 17a3 are remained in a state of being attached to the extraction port 50 (the third state, refer to FIGS. 16 and 17).

At the time of opening, when the ring 15 and the like are remained in the state of being attached to the extraction port 50, and the cap main body 11 and the like are detached from the extraction port 50, to cause a connection state between the cap main body 11 and the ring 15 via the coupling portions 13 and a connection state between the upper portions 17al and the lower portions 17a2 of the leg portions 17a via the middle portions 17a3 to be released (the third state), the sealing state of the passage portion 17 is released to bring a state in which air flows from broken parts of the middle portions 17a3 through the upper portions 17al into the display chamber 17b. In particular, in a case in which sealing is performed in a state in which the passage portion 17 is in a vacuum state (or in a low-air-pressure state) in the process of fixing (or mounting) the oxygen detection agent 17c in the display chamber 17b and the process of attaching the lid portion 17d to the display chamber 17b, air flows into the upper portions 17al and the display chamber 17b easily due to the pressure difference when the sealing state is released.

Once the connection between the cap main body 11 and the ring 15 via the coupling portions 13 is lost, a distance between the cap main body 11 and the ring 15 differs from that before the breakage even when the cap main body 11 is attached to the extraction port 50 again. For this reason, one can recognize whether the cap main body 11 has been opened when one looks at it well.

However, the amount of the difference is not large, and one may not recognize that the cap main body 11 has been opened when one does not look at it with care. Conversely, in the first embodiment, one can easily recognize whether or not the cap main body 11 has been opened by looking at a color state (color change) of the oxygen detection agent 17c that can be seen through the lid portion 17d provided on the upper surface of the cap main body 11.

Also, in the first embodiment, since the passage portion 17 to be broken is formed separately from the cap main body 11 and the ring 15, the cap 10 can be manufactured more easily than in a mode in which an air passage is formed by producing a hole in the cap main body 11 and the like.

In particular, in the case in which the cap 10 is formed by, in the state in which the passage portion 17 (excluding the oxygen detection agent 17c and the lid portion 17d) formed in advance is attached to any of the first to fourth molds 31 to 34 in the space surrounded by the first to fourth molds 31 to 34, pouring the molten material constituting the cap main body 11, the coupling portions 13, and the ring 15 (shown in black in FIGS. 10 and 11) into the space, a mold having an approximately equal shape to that of a cap provided with no passage portion 17 can be used.

Also, to allow one to visually recognize the difference of the color of the oxygen detection agent 17c from the color of objects other than the oxygen detection agent 17c when the color of the oxygen detection agent 17c changes, the color of a surrounding of the lid portion 17d (the upper surface of the cap main body 11 and the upper surface of the display chamber 17b) is preferably further similar to the color of the oxygen detection agent 17c seen through the lid portion 17d before the connection state between the cap main body 11 and the ring 15 via the coupling portions 13 is released than the color of the oxygen detection agent 17c seen through the lid portion 17d after the connection state between the cap main body 11 and the ring 15 via the coupling portions 13 has been released. For example, the color of the upper surface of the cap main body 11 (the surrounding of the lid portion 17d) is set to be approximately equal to the color of the oxygen detection agent 17c in the first state.

Also, as illustrated in FIG. 1 and the like, the lid portion 17d may be formed in a shape that is not related to an opening/closing state of the cap such as a round shape, and in another mode, the lid portion 17d may be formed in a shape of a character or a symbol indicating that the cap has been opened (e.g., a Chinese character of "open"). In this case, one can visually recognize that the cap has been opened not only by the color but also by the character. Also, the lid portion 17d may be formed in a shape of a character indicating whether or not one has won a prize, instead of the character indicating the cap has been opened.

Also, instead of the oxygen detection agent 17c that changes color in accordance with concentration of oxygen, a detection member that changes color in accordance with concentration of another substance may be used in another mode. In this case, a gas to be filled in the passage portion 17 in the process of fixing (or mounting) the detection member in the display chamber 17b and the process of attaching the lid portion 17d to the display chamber 17b is considered (the passage portion 17 may be in a vacuum state) so that concentration of the substance detected by the detection member may differ significantly between the concentration before unsealing of the passage portion 17 and that after unsealing.

Also, the mode has been described in which air flows into the upper portions 17a1 of the leg portions 17a of the passage portion 17 and the display chamber 17b due to breakage of the middle portions 17a3, and in which one is informed whether or not the cap 10 has been opened by visually recognizing the state of the color change of the oxygen detection agent 17c in the display chamber 17b through the lid portion 17d. However, a method for informing whether or not the cap 10 has been opened is not limited to one using a chemical reaction of the oxygen detection agent 17c or the like but may be a mode in which a detection member that changes its state (the color or the shape) due to breakage of the middle portions 17a3 of the leg portions 17a is used.

Figure 18:
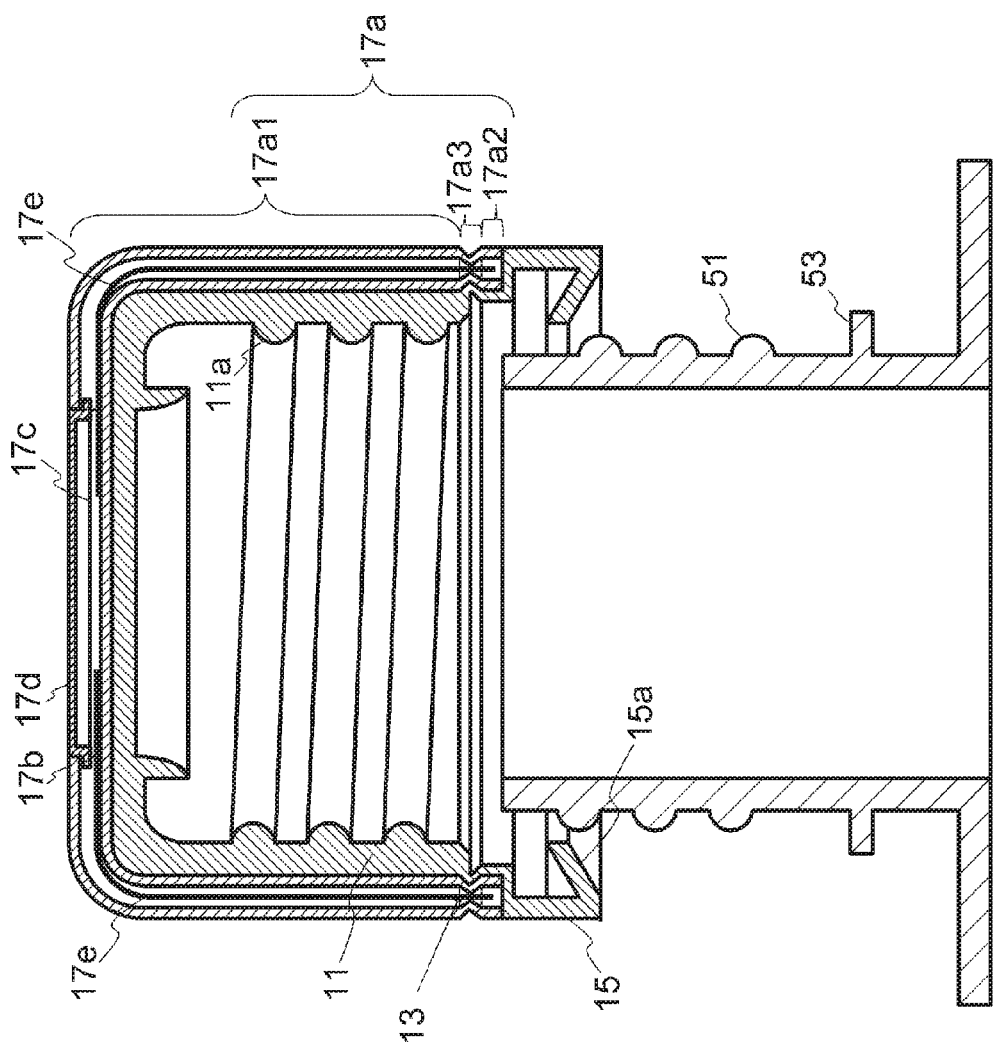
FIG. 18 is a cross-sectional view illustrating positional relationship between the cap and the extraction port in the first state in a case in which a string-like member is used as the detection member.
Figure 19:
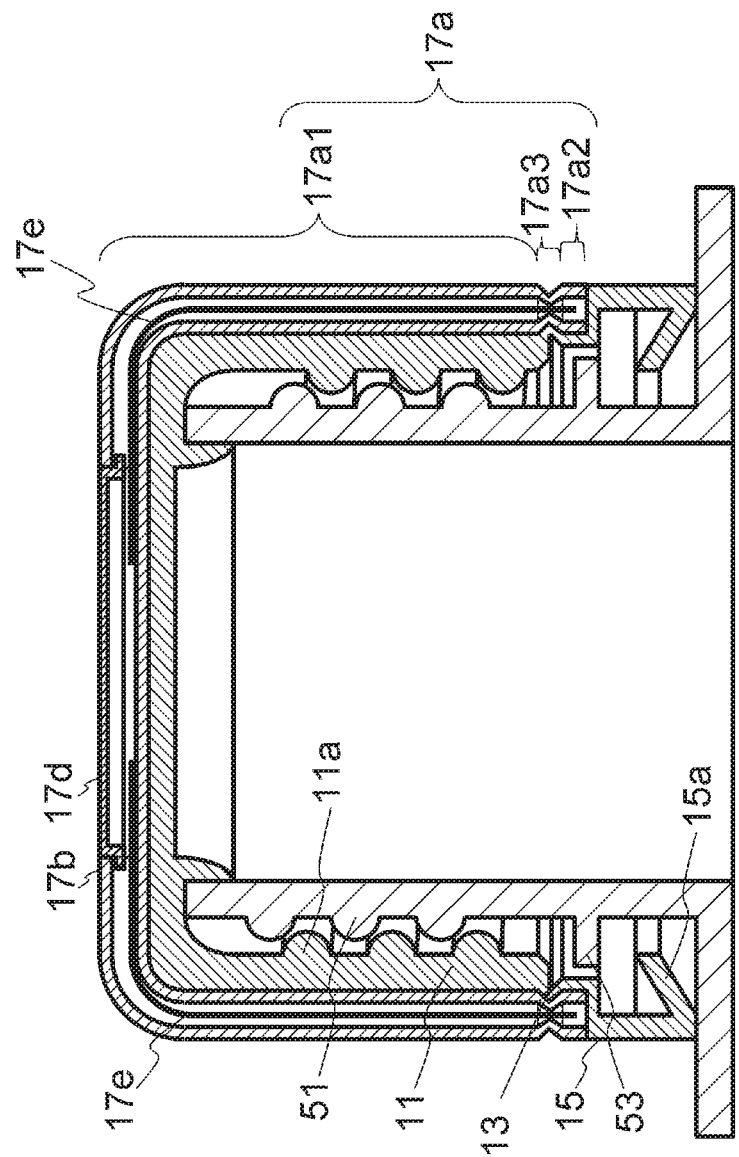
FIG. 19 is a cross-sectional view illustrating positional relationship between the cap and the extraction port in the second state in the case in which the string-like member is used as the detection member.
Figure 20:
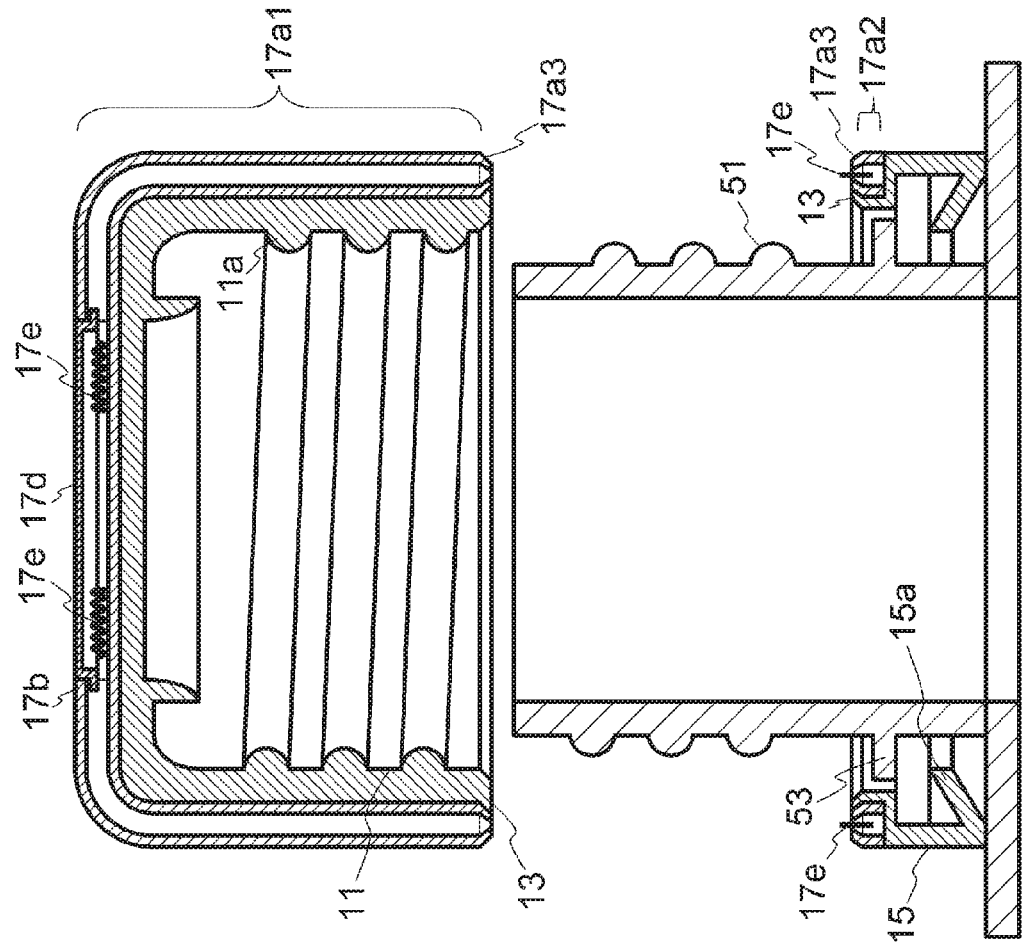
FIG. 20 is a cross-sectional view illustrating positional relationship between the cap and the extraction port in the third state in the case in which the string-like member is used as the detection member.

For example, a mode in which the string-like member (the elastic member) 17e having elasticity is attached to the passage portion 17 is raised (refer to FIGS. 18 to 20). Specifically, one end portion of the string-like member 17e is fixed to the display chamber 17b (or the upper portion 17a1 of the leg portion 17a), and the other end portion is fixed to the lower portion 17a2 of the leg portion 17a in a stretched state. In another mode of fixing to the lower portion 17a2, the string-like member 17e may be hung on the squeezed part of the middle portion 17a3. The string of the string-like member 17e described herein includes a thin string such as a thread. When the middle portion 17a3 is broken, the string-like member 17e is also broken around the broken part or is pulled from the lower portion 17a2, and a large part of the string-like member 17e is contracted and is gathered in a part around the fixed end portion at the display chamber 17b (or the upper portion 17a1) in a contracted state. Thus, when the string-like member 17e in the contracted state exists in the display chamber 17*b*, one finds the cap 10 has been opened, and when the string-like member 17*e* in the stretched state exists there, one finds the cap 10 has not been opened. In another mode, one string-like member 17*e* may be fixed to straddle two leg portions 17*a* as long as the end portions are fixed to the passage portion 17 in the stretched state.

The above mode is more advantageous than the mode in which whether or not the cap 10 has been opened is determined based on whether or not the detection member is chemically reacted in that malfunction (discoloring even in an unopened state) caused by deterioration is unlikely to occur.

In a case in which the elastic member constituting the string-like member 17*e* is made of a material excellent in heat resistance such as fluorine-containing rubber, the cap 10 can be formed in the mode of, in the state in which the passage portion 17 (excluding the lid portion 17*d*) to which the string-like member 17*e* is attached inside is attached to any of the first to fourth molds 31 to 34 in the space surrounded by the first to fourth molds 31 to 34, pouring the molten material constituting the cap main body 11, the coupling portions 13, and the ring 15 into the space.

Further, the coating member coating the string-like member 17*e* can be used as the leg portion 17*a*. For example, a mode is raised in which a thin-plate-like (or tape-like) member made of a material excellent in heat resistance such as glass, silica, alumina, and paper is used as the leg portion 17*a* and coats the string-like member 17*e*. The leg portion 17*a* of the passage portion 17 can be formed only by coating the detection member (the string-like member 17*e*).

Figure 24:
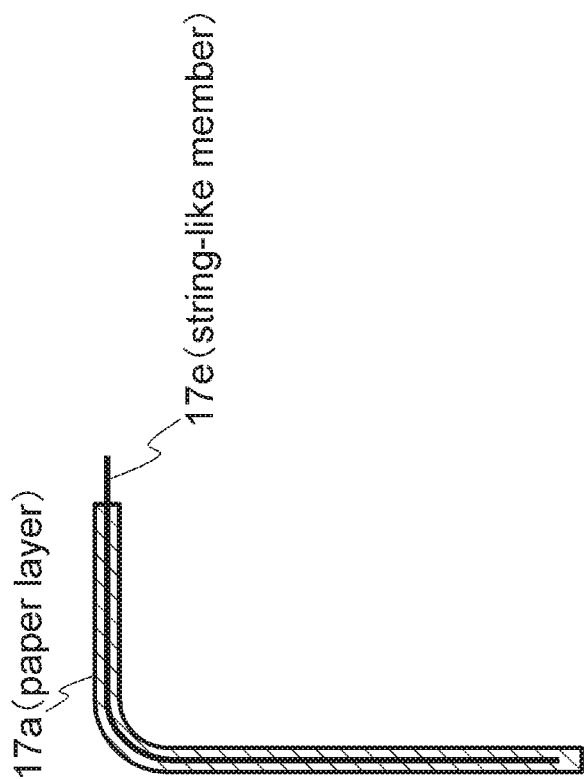
FIG. 24 is a cross-sectional view of the string-like member and the leg portion in a case in which the leg portion is formed by a paper-like member made in a state of coating the string-like member (the detection member).

In particular, in a case of using the paper, the leg portion 17*a* is formed by a paper-like member made in a state of coating the string-like member 17*e*. Specifically, the detection member and the leg portion 17*a* can be formed easily by pouring a paper material to coat the string-like member 17*e* and forming a paper layer around the string-like member 17*e* to use the paper layer as the leg portion 17*a* (refer to FIG. 24).

In a case in which a material having low heat resistance is used as the string-like member 17*e*, it is preferable to form the cap main body 11, the coupling portions 13, and the ring 15 by means of injection molding or the like in a state of not attaching the passage portion 17 and, after they are formed, attach the passage portion 17 by means of fitting or the like.

Also, the string-like member 17*e* is not limited to the member having elasticity such as fluorine-containing rubber and silicone and may be a member formed by bundling fibers and having almost no elasticity. In this case, when the middle portion 17*a*3 is broken, the string-like member 17*e* is also broken around the broken part or is pulled from the lower portion 17*a*2 and is partially exposed from the middle portion 17*a*3. One finds the cap 10 has been opened from existence of the exposed string-like member 17*e*.

In the first embodiment, although the mode has been described in which the separate second member (the passage portion 17) in which the passages are formed is provided in the first member (the cap main body 11 and the like), a mode may be employed in which the second member (a cover 18) in which no passages are formed is attached to the first member (the cap main body 11 and the like), and in which the passage portion is formed between the first member and the second member (a second embodiment).

Specifically, recesses are formed on the side surface and the upper surface of the cap main body 11, and the cover 18 covers the side surface and the upper surface of the cap main body 11 and part of the ring 15. The recesses between the cover 18 and the cap main body 11 form the passage portion 17 (the leg portions 17*a* and the display chamber 17*b*). The recesses are not limited to ones provided outside the cap main body 11 (the side surface and the upper surface) and may be ones provided inside the cover 18 (a side surface and an upper surface). The cover 18 includes an engaging member (not illustrated) permanently set at the time of being attached and engaging with the cap main body 11 or the like. The first member (the cap main body 11 and the ring 15) and the second member (the cover 18) are respectively formed by means of injection molding or the like.

One end portion of the string-like member 17*e* is fixed to a part serving as the recess of the cap main body 11 and constituting the display chamber 17*b* (or the upper portion 17*a*1 of the leg portion 17*a*), and the other end portion of the string-like member 17*e* is fixed to a part constituting the lower portion 17*a*2 of the leg portion 17*a* in a stretched state. When the middle portion 17*a*3 is broken, the string-like member 17*e* is also broken around the broken part or is pulled from the lower portion 17*a*2, and a large part of the string-like member 17*e* is contracted and is gathered in a part around the fixed end portion at the display chamber 17*b* (or the upper portion 17*a*1) in a contracted state. Thus, when the string-like member 17*e* in the contracted state exists in the display chamber 17*b*, one finds the cap 10 has been opened, and when the string-like member 17*e* in the stretched state exists there, one finds the cap 10 has not been opened. In another mode, one string-like member 17*e* may be fixed to straddle two leg portions 17*a* as long as the end portions are fixed to the passage portion 17 in the stretched state.

Also, in a case in which the cap main body 11, the coupling portions 13, and the ring 15 are covered with the cover 18, and in which the sealed passage portion 17 is formed between the cover 18 and the cap main body 11, the coupling portions 13, and the ring 15, a member, such as the oxygen detection agent 17*c*, which changes color in accordance with concentration of a specific substance contained in air that the member itself contacts, can be used as the detection member.

Figure 21:
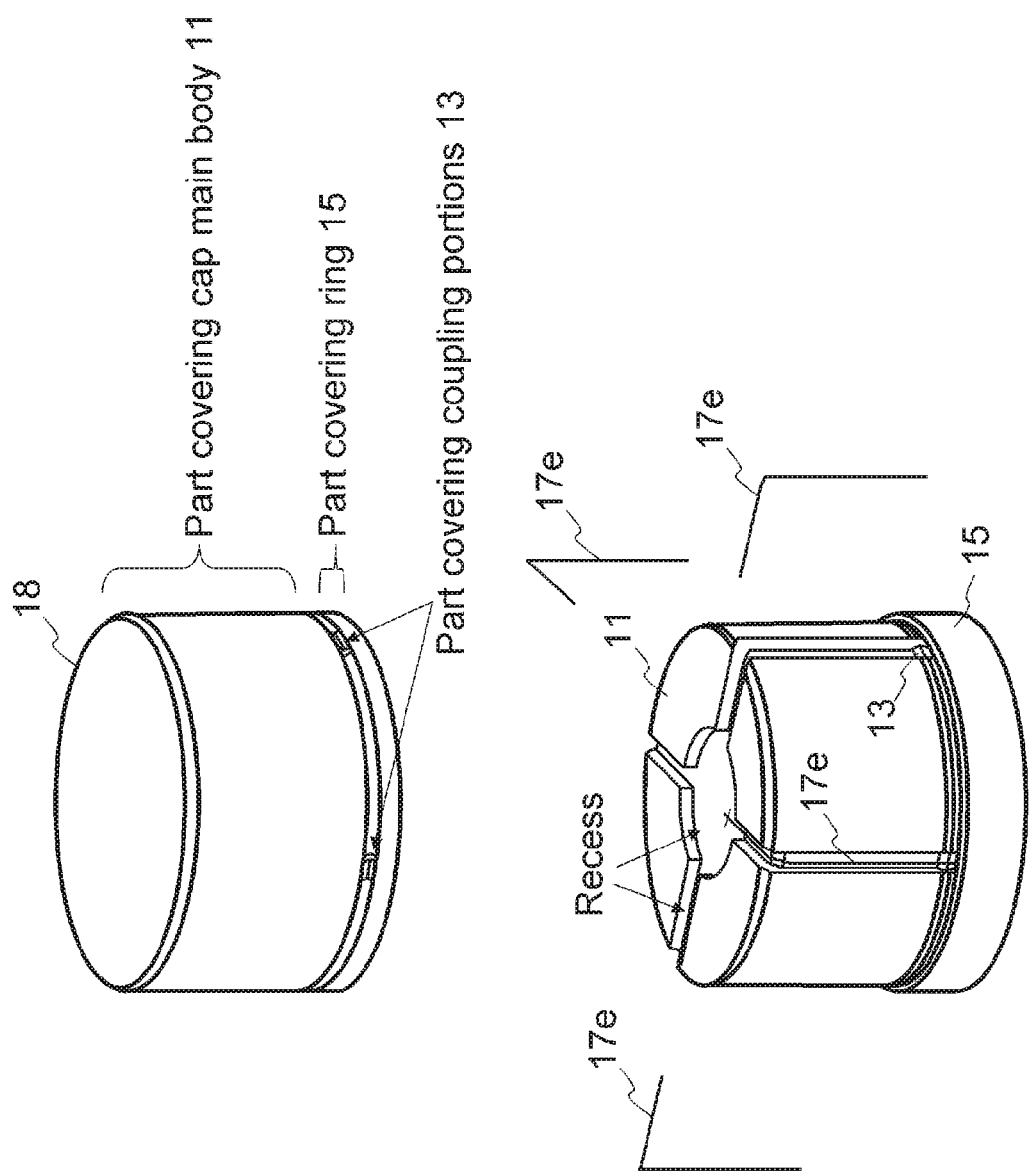
FIG. 21 is a perspective view of the cap according to a second embodiment in which a second member (a cover) is attached to a first member (the cap main body and a ring) that has been molded.
Figure 22:
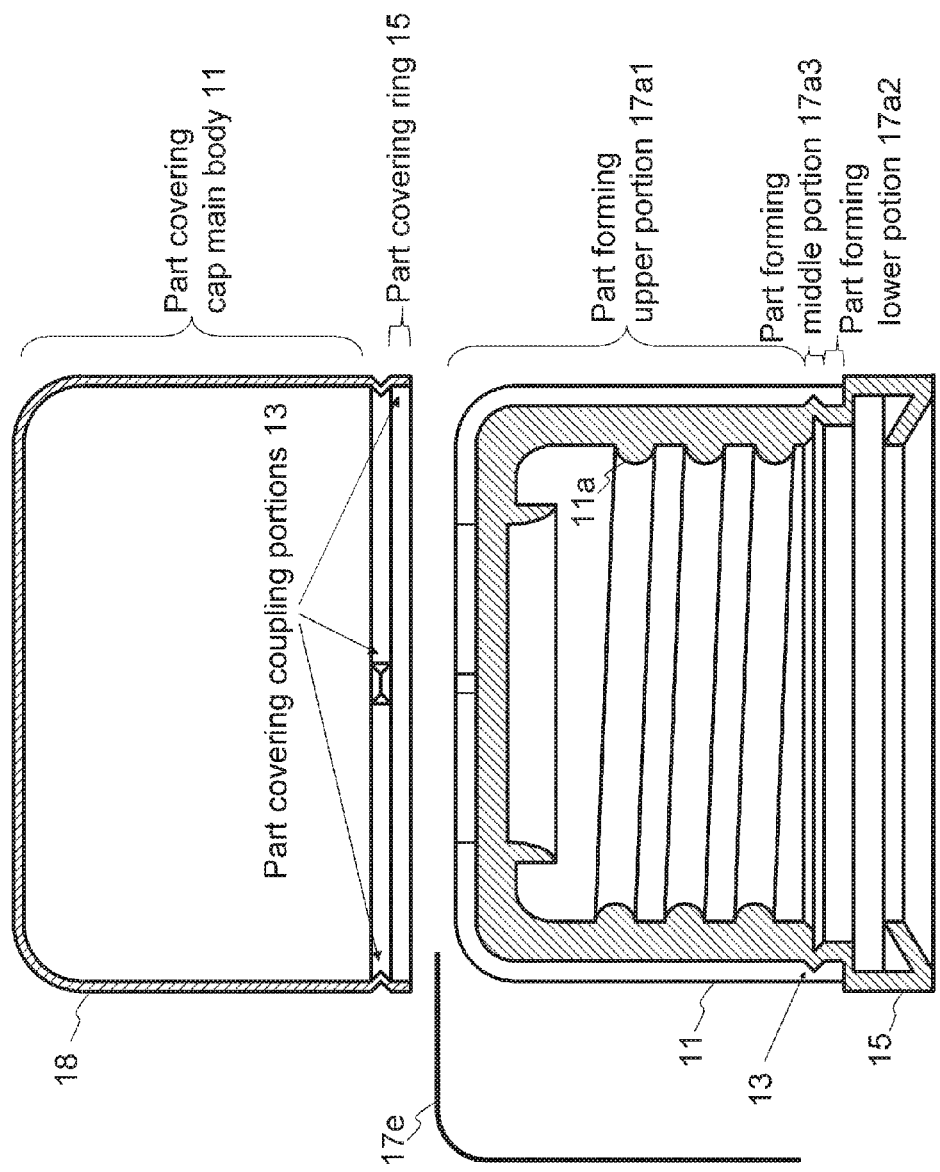
FIG. 22 is a cross-sectional view illustrating a state before the second member (the cover) is attached to the first member (the cap main body and the ring) according to the second embodiment.
Figure 23:
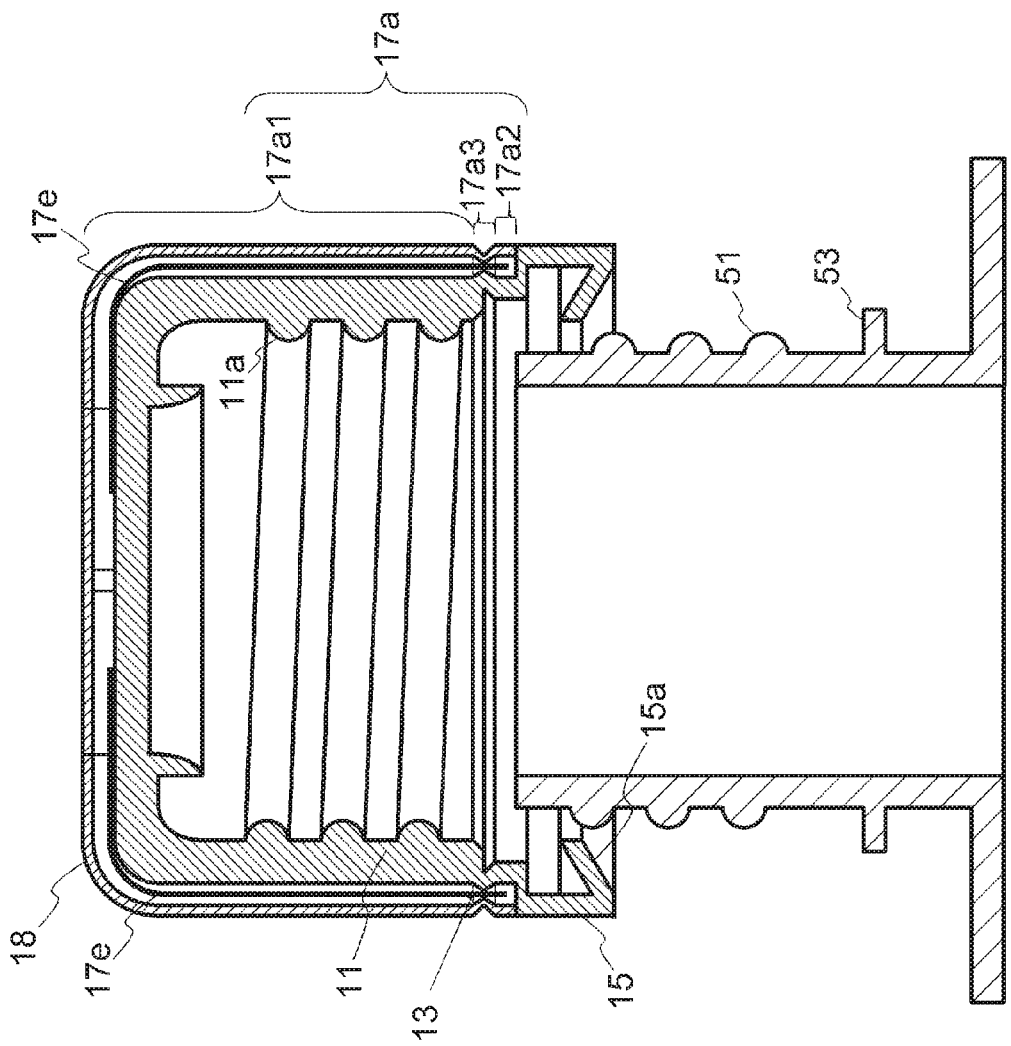
FIG. 23 is a cross-sectional view illustrating a state before the cap in which the second member (the cover) has been attached to the first member (the cap main body and the ring) is attached to the extraction port of a container according to the second embodiment.

Also, in a case in which the cover 18 has sufficient transparency to enable the detection member (the oxygen detection agent 17*c* or the string-like member 17*e*) inside to be viewed, one can confirm state changes of the detection member (a color change of the oxygen detection agent 17*c* or the degree of contraction of the string-like member 17*e*) from the cover 18, and a window (the lid portion 17*d*) on the upper surface of the display chamber 17*b* can thus be omitted. FIGS. 21 to 23 illustrate the mode in which the lid portion 17*d* is omitted. Further, the passage portion 17 may omit the display chamber 17*b* and be formed in a shape in which the leg portions 17*a* are combined with each other.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

10 cap
11 cap main body
11*a* inner screw portion
13 coupling portion
15 ring
15*a* retaining flap 17 passage portion
17a leg portion
17a1 upper portion of leg portion
17a2 lower portion of leg portion
17a3 middle portion of leg portion
17b display chamber
17c oxygen detection agent
17d lid portion
17d1 projecting portion of lid portion
17e string-like member
18 cover
31 to 34 first to fourth molds
50 extraction port
51 outer screw portion
53 rib

The invention claimed is:

1. A cap configured to be attached to an extraction port of a container, comprising:
    a cap main body detached from the container at time of opening;
    a ring remained the container at the time of opening; and
    a passage portion,
    wherein the passage portion is formed separately from the cap main body and the ring and attached to the cap main body and the ring, or
    the passage portion is formed by covering a side surface and an upper surface of the cap main body with a cover and disposed in the cap main body and the ring;
    wherein the passage portion contains a detection member;
    wherein the passage portion includes a leg portion provided in the ring and the cap main body;
    wherein an internal space of an upper portion of the leg portion provided in the cap main body and an internal space of a middle portion between the upper portion and a lower portion of the leg portion provided in the ring communicate with each other by the passage portion through which at least one of air and the detection member passes;
    wherein the middle portion is configured to be broken when the cap main body is turned into a cap detaching direction, so that the internal space of the middle portion is exposed to an outside of the cap main body; and
    wherein, when the middle portion is exposed to an outside of the cap main body, a state of the detection member provided in the passage portion changes.

2. The cap according to claim 1, wherein the passage portion is formed separately from the cap main body and the ring,
    wherein the detection member is made of a string-like member, and
    wherein the leg portion is formed by a paper-like member made in a state of coating the string-like detection member.

3. The cap according to claim 2, wherein the detection member is made of an elastic member, is fixed at an end portion thereof to the passage portion in a stretched state, and is contracted by breakage of the middle portion.

4. The cap according to claim 1, wherein the passage portion is formed by the cover and the cap main body, and
    wherein the detection member is an elastic member, is fixed at an end portion thereof to the passage portion in a stretched state, and is contracted by breakage of the middle portion.

5. The cap according to claim 1, wherein the passage portion is formed by the cover and the cap main body, and
    wherein the cover has as much transparency as to enable the detection member inside to be seen.

6. The cap according to claim 1, wherein the passage portion is formed separately from the cap main body and the ring,
    wherein the detection member is an elastic member, is fixed at an end portion thereof to the passage portion in a stretched state, and is contracted by breakage of the middle portion, and
    wherein the leg portion is a coating member coating the elastic member.

7. A manufacturing method of a cap comprising steps of:
    forming a cap main body and a ring; and
    attaching a lid portion to a display chamber after the forming of the cap main body and the ring,
    wherein the cap includes the cap main body, the ring, and a passage portion;
    wherein the cap main body is detached from the container at time of opening;
    wherein the ring is remained on the container at the time of opening;
    wherein the passage portion is formed separately from the camp main body and the ring and is attached to the cap main body and the ring;
    wherein the passage portion contains a detection member;
    wherein the passage portion includes a leg portion provided in the ring and the cap main body;
    wherein an internal space of an upper portion of the leg portion provided in the cap main body and an internal space of a middle portion between the upper portion and a lower portion of the leg portion provided in the ring communicate with each other by the passage portion through which at least one of air and the detection member passes;
    wherein the middle portion is configured to be broken when the cap main body is turned into a cap detaching direction, so that the internal space of the middle portion is exposed to an outside of the cap main body;
    wherein, when the internal space of the middle portion is exposed to an outside of the cap main body, a state of the detection member provided in the passage portion changes;
    wherein the passage portion includes the leg portion, the display chamber formed in a cylindrical shape having a bottom portion and a side portion, opened at an upper portion thereof, and attached to the upper surface of the cap main body, the detection member mounted or fixed in the display chamber at least partially, and the lid portion used to close the opening of the upper portion of the display chamber, made of a transparent member at a part thereof opposed to the bottom portion of the display chamber, and engaging with the display chamber to be permanently set at time of being attached;
    wherein the leg portion and the display chamber are made of a material having a higher melting point than that of a material for the cap main body; and
    wherein, in the step of forming the cap main body and the ring, the cap main body and the ring are formed by, in a state in which the leg portion and the display chamber are attached to a mold, pouring a molten material constituting the cap main body and the ring.

8. The cap according to claim 1, wherein the passage portion is formed separately from the cap main body and the ring, and wherein the cap main body and the ring are formed in a state of not attaching the passage portion, and, after they are formed, the passage portion is attached by means of fitting.

9. A cap configured to be attached to an extraction port of a container, comprising:
- a cap main body detached from the container at time of opening;
- a ring remained the container at the time of opening; and
- a passage portion,
- wherein the passage portion is formed separately from the cap main body and the ring and attached to the cap main body and the ring;
- wherein the passage portion contains a detection member;
- wherein the passage portion includes a leg portion provided in the ring and the cap main body;
- wherein at least an upper portion of the leg portion provided in the cap main body and a middle portion between the upper portion and a lower portion of the leg portion provided in the ring communicate with each other by a passage of the passage portion through which at least one of air and the detection member passes;
- wherein, when the middle portion of the leg portion is broken, a state of the detection member provided in the passage portion changes; and
- wherein the passage portion is made of a tubular member having the passage.

10. The cap according to claim 1, wherein the detection member changes color in accordance with concentration of a specific substance contained in air that the member itself contacts,
- wherein the passage portion includes the leg portion, a display chamber formed in a cylindrical shape having a bottom portion and a side portion, opened at an upper portion thereof, and attached to the upper surface of the cap main body, the detection member mounted or fixed in the display chamber at least partially, and a lid portion, which comprises a half mirror, used to close the opening of the upper portion of the display chamber, made of a transparent member at a part thereof opposed to the bottom portion of the display chamber, and engaging with the display chamber to be permanently set at time of being attached, and
- wherein the part of the lid portion opposed to the display chamber is provided with a member reflecting light from outside.

11. The cap according to claim 1, wherein the detection member is a sheet-like member in which a solvent which changes color in accordance with concentration of a specific substance contained in air that the member itself contacts is absorbed.

12. The cap according to claim 1, wherein in a case in which the passage portion is formed separately from the cap main body and the ring, the passage portion is made of a tubular member having the passage, and
- wherein the middle portion of the leg portion is formed to be thinner than the upper portion and the lower portion of the leg portion.

13. The cap according to claim 1, wherein the internal space of the upper portion, the internal space of the middle portion, and an internal space of the lower portion communicate with each other by the passage.

14. The cap according to claim 1, wherein the middle portion is arranged under a lower surface of the cap main body and the lower surface of the cap main body faces an upper portion of the ring.

* * * * *